US012674553B2

(12) United States Patent
Merrill et al.

(10) Patent No.: US 12,674,553 B2
(45) Date of Patent: Jul. 7, 2026

(54) GLARE-REDUCING LIGHTING SYSTEM FOR AN INDOOR PICKLEBALL COURT

(71) Applicant: PICKLR, INC., Kaysville, UT (US)

(72) Inventors: Jordon Merrill, Kaysville, UT (US); Megan Lawler, Los Angeles, CA (US); Leslie Thomas, Kaysville, UT (US); Greg Doench, Kaysville, UT (US)

(73) Assignee: PICKLR, INC., Kaysville, UT (US)

( * ) Notice: Subject to any disclaimer, the term of this patent is extended or adjusted under 35 U.S.C. 154(b) by 0 days.

(21) Appl. No.: 19/284,510

(22) Filed: Jul. 29, 2025

(65) Prior Publication Data

US 2026/0036271 A1 Feb. 5, 2026

Related U.S. Application Data

(60) Provisional application No. 63/677,356, filed on Jul. 30, 2024.

(51) Int. Cl.

| | |
|---|---|
| ***F21S 8/06*** | (2006.01) |
| ***A63B 61/00*** | (2006.01) |
| ***E04B 9/34*** | (2006.01) |
| ***F21W 131/407*** | (2006.01) |

(52) U.S. Cl.

CPC .............. *F21S 8/06* (2013.01); *A63B 61/003* (2013.01); *E04B 9/345* (2013.01); *A63B 2225/74* (2020.08); *F21W 2131/407* (2013.01)

(58) Field of Classification Search

CPC .......... F21S 8/06; A63B 61/003; A63B 71/02; E04B 9/345

USPC ................................ 362/145, 147, 253, 234

See application file for complete search history.

(56) References Cited

U.S. PATENT DOCUMENTS

| | | | | |
|---|---|---|---|---|
| 4,141,056 A * | 2/1979 | Neely | F21S 8/086 362/249.06 |
| 10,359,163 B1 * | 7/2019 | Hettwer | F21S 4/28 |
| 11,118,744 B2 * | 9/2021 | Papineau | F21S 8/081 |
| 2018/0245334 A1 * | 8/2018 | Udagawa | F21S 8/06 |

OTHER PUBLICATIONS

J2 Pet Acoustic Cloud Grid—Horizon, Product Data and Specifications, j2systems.net, 1 page, accessed Jan. 3, 2024.

J2 Pet Felt Acoustic Cloud Grid, Product Assembly and Installation Guide, j2systems. net, 3 pages, accessed Feb. 17, 2023.

* cited by examiner

*Primary Examiner* — Thomas M Sember

(74) *Attorney, Agent, or Firm* — Quarles & Brady LLP

(57) ABSTRACT

A glare-reducing lighting system for an indoor pickleball court includes a hanging noise baffle grid and a hanging downwardly directed light fixture. The hanging downwardly directed light fixture is positioned within an outside perimeter of the hanging noise baffle grid. A ceiling and walls of the indoor pickleball court are black.

20 Claims, 41 Drawing Sheets

GLARE-REDUCING LIGHTING SYSTEM FOR AN INDOOR PICKLEBALL COURT

CROSS REFERENCE TO RELATED APPLICATION

This application is based on and claims to the benefit of U.S. Provisional Patent Application No. 63/677,356, filed on Jul. 30, 2024, and entitled "GLARE-REDUCING LIGHTING SYSTEM FOR AN INDOOR PICKLEBALL COURT."

FIELD OF THE DISCLOSURE

Embodiments disclosed in the present application relate to improvements in lighting for indoor sport courts, specifically, indoor pickleball courts.

BACKGROUND

USA Pickleball (USAPickleball.org) is the national governing body for the sport of pickleball in the United States. Pickleball is one of the fastest growing sports in the U.S. As explained by USA Pickleball and the American Sports Builders Association in the joint publication *Pickleball Courts—Construction & Maintenance Manual* 2020, "Pickleball is an easy-to-learn and fun sport that combines many elements of tennis, badminton and ping-pong. It can be played both indoors or outdoors on a badminton-sized court with a slightly modified tennis net. Pickleball uses a solid and/or composite paddle and a seamless, perforated plastic ball approximately the size of a baseball. Like other racquet and paddle sports, the object of pickleball is to hit the ball over the net so the opposing player or team cannot return it successfully." (Hereinafter, "*PickleBall Courts Construction Manual* 2020")

According to USA Pickleball (USAP), in 2020 there were about 33,000 indoor and outdoor pickleball courts in the U.S. in all 50 states. The sport is played by all ages, and at all levels, from social and recreational players to competitive tournament players. The Sports & Fitness Industry Association's 2020 Participation Report puts the number of players in the United States at 3.46 million.

The Sport & Rules of Pickleball

Section 2 of the USAP/IFP "Official Rulebook" specifies dimensions, measurements, lines, areas and net for the standard pickleball court:

- The court shall be a rectangle 20' (6.10 m) wide and 44' (13.41 m) long for both singles and doubles matches.
- A total playing surface 30' (9.14 m) wide and 60' (18.28 m) long is the minimum size that is recommended.
- Court measurements shall be made to the outside of the lines. The lines should be 2" (5.1 cm) wide and the same color, clearly contrasting with the color of the playing surface.

Further, in support of and addition to the above dimensions, USAP and ASBA recommend:

- Minimum total playing area for recreational/drop-in play: 30' (9.14 m)×60' (18.28 m).
- Recommended total playing area for competitive/tournament play and new construction: 34' (10.36 m)×64' (19.51 m).
- Recommended total playing area for wheelchair play: 44' (13.41 m)×74' (22.55 m).
- Recommended total playing area for a stadium court: 50' (15.24 m)×80' (24.384 m).

With reference to FIG. 1 (Prior Art), which is reproduced from the *Pickleball Courts Construction Manual* 2020 at page 3, the lines and areas of the standard pickleball court are:

- Baselines. The baselines are the lines parallel to the net at each end of the court.
- Sidelines. The sidelines are the lines perpendicular to the net on each side of the court.
- Non-Volley Line. The non-volley line is the line on each side of the net between the sidelines and parallel to the net. These lines are located 7' (2.13 m) from the net.
- Non-Volley Zone (NVZ): The Non-Volley Zone is the 7-foot by 20-foot area adjacent to each side of the net. All lines bounding the NVZ are part of the NVZ. The NVZ is two-dimensional and does not rise above the playing surface.
- Centerline. The centerline is the line on each side of the net bisecting the area between the non-volley line and the baseline.
- Service Courts. The service courts are the areas on either side of the centerline, bounded by the non-volley line, the baseline, and the sideline.

Based on the USAP/IFP "Official Rulebook" and upon USAP/ASBA recommendations, net specifications are:

- Material. The net may be made of any open, meshed fabric material.
- Net Size. With net posts placed 12" outside the sidelines, the net length shall be at least 21' 9" (6.63 m) finished length. The width of the net, from bottom to the top of the net, shall be at least 2.5' (0.8 m).
- Mesh Size. The net's mesh size must be sufficiently small to prevent a ball from passing through it.
- Width [or height]. The net shall be suspended over the center of the court and shall be 36" (0.914 m) high at the sidelines and 34" (0.86 m) high at the center of the court.
- Center Strap. A center strap may be placed at the center of the net to enable easy adjustment to the 34" (0.86 m) requirement at center.
- Net Edge. The top of the net should be edged with a 2" (5.1 cm) white binding over a cord or cable running through the binding. This binding must rest upon the cord or cable.
- Posts. Net posts should be placed outside the sidelines. Recommended placement is 12" (30.48 cm) from the sideline. The maximum diameter of the net post should be 3" (7.62 cm). Net posts should be 22 feet from the inside of one post to the inside of the other post.

Overruns are the amount of court space outside of the playing area, in which a player can "run down" a ball that is in play but headed out of bounds, or in which a player can decelerate after running to make a shot that is in bounds. Overruns are shown in example in FIGS. 2A-C (Prior Art), which are reproduced from *Pickleball Courts Construction Manual* 2020 at pages 9-11. The recommended overruns per the USAP/ASBA reflect current industry practice regarding a reasonable balancing of player performance and comfort considerations and practical considerations regarding utilization of space. Measurements of the overall playing area of a pickleball court are taken from the center line of each chain link fence line or from the inside surface of any fixed obstruction or wall.

Conventional Pickleball Court Surfaces

Current industry courts include outdoor hard courts, outdoor clay courts, and a variety of different indoor court surfaces. For outdoor hard courts, concrete and asphalt are common choices. Typically, most concrete slabs and asphalt pavement courts include a surface system (such as an acrylic coating), which is installed over the post-tensioned concrete or asphalt sub-surface. Nearly all competitive, tournament and championship courts are hard courts. On the recreational level, clay and fast-dry outdoor courts are growing in popularity, many of which are converted tennis courts. If well-maintained, an outdoor clay court is a good option for those who prefer a cooler surface than an outdoor hard court.

When selecting and building a pickleball court surface, ball bounce and "speed" will need to be considered. Ideal ball/surface interaction also may vary. For example, the rougher the texture of the court, the more the surface will grip the ball and the slower the surface will play; too smooth a surface may result in play that is uncomfortably fast.

For indoor courts, a wider variety of surfaces have been attempted, though not always with success, and often without these surfaces being sanctioned by the USPA for official events. These surfaces include carpet, gymnasium floors, prefabricated panel flooring systems, and rolled out systems. Polypropylene tile is also sometimes used. However, each of these indoor surfaces generally suffer from either poor playability, or poor durability, or both.

Color coating the asphalt or concrete base creates a uniform playing surface and helps the pavement resist weathering. The manufacturer will provide instructions for mixing and applying its surfacing material.

The first step to applying a color coating is to clean the pavement thoroughly. Then, the pavement is flooded with water to check for planarity and to identify low areas ("birdbaths), which are areas where standing water is at least 1/16" thick (the thickness of a nickel). With a string line, check to see whether the birdbaths are truly low spots or are formed by surrounding high areas. Low areas need to be patched and leveled; high areas can be leveled by scraping or grinding.

To correct these minor surface irregularities, apply a patching compound, which may consist of an acrylic binder mixed with Portland cement and a sand aggregate. Make sure the weather and temperature (at least 55 degrees F.) will cooperate with the application schedule. One or more layers of patching compound may be applied. The patching compound coats should be compatible with the color surface supplier.

The next step is to apply textured filler coats, which are generally applied with a squeegee. Each textured filler coat typically includes a quantity of sand. Allow each coat to dry thoroughly before applying subsequent layers.

The color finish coats go down next, and are also applied with a squeegee. Generally, the court will have two or three coats of coloring material, applied smoothly and to a uniform thickness over the entire surface. Each coat must dry completely before the next coat is applied; follow the manufacturer's recommendations. The color finish coats also typically have a quantity of sand in the mixture. This sand helps give the pickleball court a further texture and provides traction for the playing surface, thereby improving playability.

When the color coating is dry, the court should be lined with one or two coats of textured line paint as recommended by the color coating manufacturer. Generally, allow at least 72 hours for an acrylic surface to cure completely before playing on the court.

With reference to FIG. 3 (Prior Art), which is reproduced from *Pickleball Courts Construction Manual* 2020 at page 46, various known acrylic court surface systems are illustrated. Specifically, FIG. 3 illustrates three separate court surface systems that include a line marking 102 on a playing surface 104. In a first system, two layers of an acrylic filler coat 106 are beneath the playing surface 104 when disposed above asphalt pavement 110, and a concrete base coat 108 is beneath the playing surface 104 when disposed above a concrete base 112. In a second system, a plurality of liquid rubber coats 114 are disposed beneath the playing surface 104 and above a plurality of acrylic filler coats 106 that, in turn, are disposed above both an asphalt pavement 110 and a concrete base 112. In a third system, several layers of a flexible filler coat 116 are positioned beneath the playing surface 104. Beneath the flexible filler coat 116 are several layers of a mat sealer 118, followed by a rubber shock pad 120, a mat adhesive 122, and then an asphalt pavement 110 and a concrete base 112.

An ideal athletic surface will absorb the energy of running, jumping and stopping in order to reduce injuries, but must also return the energy to the athlete to avoid fatigue and enhance performance. In most cases, it should not be springy like a trampoline, which might cause a loss of control or balance, nor should it be so soft as to cause the athlete's foot to stick or lock in the surface. Factors to consider include:

- Vertical Ball Rebound—While force reduction, vertical deformation and elasticity/resiliency relate to foot/surface interactions, a related performance characteristic, which describes ball/surface interaction, is vertical ball rebound, also called VCOR (Vertical Coefficient of Restitution). Vertical ball rebound is a measure of the height to which a ball bounces when dropped on the surface as compared to how high it would have bounced if dropped on concrete. This characteristic is important to ball games such as pickleball.
- Slip Resistance (Linear Friction)—Slip resistance is the ability of a surface to resist uncontrolled sliding in a linear direction. The appropriate degree of slip resistance is sport-specific. For some sports, such as pickleball, a small amount of controlled sliding may protect players from injury and enhance performance.
- Traction (Rotational Friction)—Traction is the resistance offered by a surface to the rotational movement of a player's foot or, alternatively, the measurement of the energy (torque) required to turn on a surface. This parameter will be significant to the player attempting rapid turns or twisting movements during play.

Friction also may be measured as static friction (the initial force necessary to get an object moving) and kinetic (or dynamic) friction (the force between two objects moving against each other). Since, as a practical matter, friction is an interaction between a surface and a shoe, all testing is done with a standardized "shoe"—either leather or rubber, depending on the test method and apparatus. The safety and performance of a surface will vary when inappropriate shoes are worn by an athlete.

Whatever its performance characteristics, a newly installed athletic floor should be consistent in all properties over its entire surface. Such consistency is an indication of quality materials and skilled construction. In many cases, however, even a well-maintained athletic surface may change over time, particularly in high traffic areas. Eventually, inconsistency or a significant change in performance characteristics due to wear could become a performance or safety issue and, for that reason, an owner may wish to monitor such change, through testing, over the life of the surface.

The following non-athletic performance characteristics also may be important to a pickleball court owner.

- Mechanical Strength—The durability of a floor is largely determined by its ability to handle loads and its resistance to abrasion. Athletic flooring is typically exposed to loads including sports equipment, as well as maintenance equipment such as ladders or lifts for changing light bulbs or hanging banners, mat carts, etc.

Impact loads are momentary indentations, including dropped weights, tables and chairs or other equipment.

Static loads are those which remain in place for moderate to long periods of time. These might include those caused by equipment such as bleachers in open and closed positions, and staging. Static loads are measured in pounds per square inch (psi) or Newtons per millimeter squared (N/mm2).

Rolling loads are those caused by equipment which moves across the surface, for instance bleachers, carts, service vehicles, lifts and/or other wheeled equipment.

Both rolling and static loads must be calculated and the floor should be chosen and/or designed to match the loading which can be anticipated. Exceeding load limitations can cause damage not only to the surface flooring system, but also to the subfloor and/or substrate.

Abrasion Resistance—Both athletic and non-athletic use can cause wear to a pickleball surface through abrasion. Repeated movement or placement of equipment in the same location, as well as dirt or debris on the surface, can cause deterioration. Ordinary foot traffic in non-athletic shoes will increase wear of the floor. Even the multi-directional, rotational, start and stop nature of athletic movements eventually will abrade the floor and the lines, especially in high use areas. Sports surfaces will vary in their resistance to wear, in their ease of resurfacing and/or repair and in their useful life before replacement. Durability and wear resistance of certain features, such as painted logos, borders and keys, as well as design patterns in certain products need to be taken into consideration. In Applicant's experience using prior art surfacing systems results in abrasion to such an extent that Applicant's prior art court surfaces regularly result in an excessive amount of abraded court material, such as sand and colored material worn away from the court surface, accumulating on the sides and corners of court overruns and other infrequently walked upon parts of the indoor facility.

Stability—Even indoors, floors may be exposed to varying environmental conditions. Dimensional stability refers to the degree to which a surface expands or contracts in response to changes in temperature and/or relative humidity. UV-stability refers to the degree to which a surface retains color and resists becoming brittle when exposed to sunlight. The owner should consider the range of conditions likely to occur within the facility, given the type of environmental controls, (i.e., HVAC system), and the degree of natural sunlight, (i.e., skylights). A UV-stable product should be used because the floor may be exposed to natural light.

Maintenance Requirements—The level and frequency of the manufacturer's recommended cleaning and regular maintenance can greatly impact a facility's budget and should be understood prior to selecting an athletic surface.

An advantage of using a synthetic surface is it is easier to clean after a social event involving food and beverages. By virtue of design, synthetic floors can be washed with water, making clean-up less difficult.

Maintenance, however, goes beyond cleaning. Touch up or repainting lines, repairing seams or mechanical damage, periodic application of maintenance coatings or resurfacing need to be considered in a long term maintenance budget.

Life expectancy—The frequency with which an athletic floor will need to be replaced will also have an impact on the facility's maintenance budget and should be understood prior to selecting the athletic surface.

Appearance & Aesthetics—The existence of different product colors, textures and other design options allows the court owner to create the preferred ambiance in the building. It is important that the type of lighting be taken into consideration when making product and color selections; colors may have differing appearances under differing lighting types and conditions.

Existing Product for Pickleball Sport Surfaces & Use Thereof

SportMaster Neutral Concentrate (hereinafter "Neutral Concentrate") is a 100% acrylic emulsion coating formulated for tennis courts and other sport and recreational pavement surfaces, including Pickleball courts. Neutral Concentrate is the product of SportMaster Sport Surfaces, based in Sandusky, Ohio. Neutral Concentrate is designed to be mixed with SportMaster ColorPlus pigment dispersion to achieve desired color. Details regarding the use of Neutral Concentrate and ColorPlus pigment for application to concrete indoor surfaces are as follows:

Surface Preparation

The pavement surface must be cleaned entirely of dust, dirt, and debris. Repair of pavement surface defects, depressions and cracks must be completed prior to application. All repairs must be flush and smooth to adjoining surfaces.

New concrete surfaces must cure 28 days prior to application. Concrete surfaces should have a medium broom finish or similar roughened texture. Then, etch the surface with muriatic or phosphoric acid and apply SportMaster Acrylic Adhesion Promoter.

Mixing Procedures

Mix in the following order for a 55 gallon drum of Neutral Concentrate:

| | |
|---|---|
| Neutral Concentrate | 55 gallons |
| ColorPlus | 4 gallons |
| Water | 28-33 gallons |
| Silica sand | 400 pounds (70 to 90 mesh AFS) |

The material should be mixed thoroughly to ensure complete dispersion of ColorPlus.

Application

Apply mixed coating with a soft rubber squeegee. A minimum of two coats are recommended. Surface and air temperatures must be above 50° F. (10° C.) during application and for at least 24 hours after application.

Coverage

Yield calculations are based on undiluted gallons of Neutral Concentrate and vary according to surface texture and porosity within the limits of 0.05 to 0.07 gallons, per square yard, per coat.

Drying Time

Neutral Concentrate dries in 30 to 60 minutes under optimum drying conditions. Allow each coat of material to dry thoroughly before applying successive coats. Low ambient or low surface temperature and high humidity increase drying time. Allow coating to cure for 48 hours before opening up for play.

Conventional Pickleball Fencing, Court Enclosures, Accessibility and Egress

Fencing is designed to keep balls within the pickleball court during play. Depending on location, facility type and court layout, fencing for a pickleball court or facility can vary in height and may not need to surround the entire court.

The height of the fencing required often will depend on the court location. A 7' to 8' high fence is commonly used for most courts. Rooftop courts or courts that have limited to no access beyond the fence line may require a higher fence or may require extending netting above the fence. When determining the height of the fence, municipal and city codes might define how to enclose activity areas. When specifying fencing for pickleball play, there are many layouts to consider. Most pickleball courts require fencing across the back of the court and along each sideline from the corner posts to a recommended minimum of 16' up the sidelines. The remaining distance on either side of the net can be left open, or a lower fence height of 3'-6" can be used to contain rolling balls. These open designs save money on fencing, while also providing enough fencing to keep balls within the court. It also allows better visibility for spectators. Where multiple courts are to be built in a battery, leaving an open area between courts provides room for the installation of shade shelters, benches, and drinking fountains. However, care must be taken to avoid placing these structures in the overruns in a way that could interfere with the playability of the court. In indoor facilities, where space is at a premium, a careful and thoughtful arrangement of obstacles such as benches must be considered, and any approach to maximizing seating, and playable overrun space, in view of overall floor space constraints, is worthwhile.

The standard chain-link mesh size for pickleball courts is a 2" diamond-shaped fabric. The most commonly used fence fabric is 9-gauge, which is more durable and less likely to deform over the long term. The fence fabric should always be attached to the court-facing side of the fence posts for player safety and for the ease of attaching windscreens.

Most fencing comes either in a vinyl, polyester or polyolefin coated framework with similarly coated fence fabric. Vinyl or coated fencing is typically more expensive than galvanized steel fencing, but it provides numerous long-term benefits and is aesthetically more desirable. Consider coated fence materials in areas with a high level of pollution or close to salt water, where exposure to these conditions is hard on fencing materials.

Pickleball fences should be selvaged (knuckled) at the top and bottom of the fabric as a safety consideration and also to limit debris from collecting against the side of the fence. The fence fabric is attached to each line post with tie wires every 12" in accordance with most specifications.

Fence posts should be set in round concrete foundations not less than 12" in diameter and typically to a depth of 6" below the local frost line. Most foundations are excavated to a depth of 3' unless incorporated into the perimeter edge of a post-tensioned concrete slab.

Top rail pipes are typically installed on all chain-link fencing and are 1-⅝" diameter pipes, which pass through loop caps or eye tops installed on top of each line post. They are usually sleeved together by couplings and the fence fabric is attached to the top rail pipe with tie wire every 12" to 18".

Bottom rails are also recommended since they help keep the bottom of the fabric from curling up, help prevent player injury from sliding under the fence, and give a finished look to the court. Bottom rails are typically 1-⅝" diameter pipes and are attached to each post with line rail clamps. As a cost-saving alternative, a bottom tension wire can be used instead of rail pipes. Tension wire should be attached to each line post with tie wire and attached to the bottom of the fabric with hog rings.

Mid-rail pipes are sometimes specified, but they can be a potential hazard if players run into the fence during play. For stability, rather than mid-rails, consider strengthening line and terminal posts or reducing the spacing.

Gates should typically be 4' wide and 7' tall, with an adequate number to allow access to each court without interrupting play. Gates that are 4' wide allow wheelchair access and meet most ADA requirements, but be sure to check your local codes. Gates located at opposite corners allow for easy ball retrieval for balls that go over the fence.

With reference to FIGS. 4A-C (Prior Art), which is reproduced from *Pickleball Courts Construction Manual* 2020 at page 46, typical fence and gate locations are illustrated in plan and elevational views.

Conventional Pickleball Indoor Court Lighting

Pickleball is a fast sport, requiring players and spectators to view the fast-moving ball from many directions and react quickly. Typically, the pickleball is either yellow, white, or a dayglow yellow-green color. And while players of all ages play pickleball, as people get older, they require higher levels of light. So, determining the quantity of light required for your courts is an important decision for players.

In choosing lighting for pickleball courts, there are many factors to consider, such as light output, lumens per watt (efficacy), lamp life, color and degree of control. Further, the initial cost, cost of operation, frequency of use, and maintenance costs and needs also must be considered.

On a lighting plan for a pickleball court, the level of illumination should be the average "maintained" illumination, rather than initial illumination. Over time, the level of illumination produced by a new lamp depreciates (called the "light loss factor," or LLF), which can be caused by a number of factors, such as climatic conditions, dust and dirt, voltage variations and luminaire design and maintenance.

Horizontal illumination is measured 3' above the court surface. Lighting manufacturers or suppliers often can produce a computer diagram showing illumination levels in foot-candles or lux, taking into account the lamp, fixture and lighting plan. Illumination levels also can be measured with a light meter. (See FIG. 5 (Prior Art), entitled "Light Meter Reading Location Diagram," which is reproduced from *Pickleball Courts Construction Manual* 2020 at page 72, which shows where best to measure light levels on a pickleball court.) Specifically, FIG. 5 illustrates an outline of principal playing area (P.P.A) 128, pickleball court playing lines 130, and a typical light meter reading at 3'-0" above court surface 132.

Vertical illumination indicates the amount of light on the surface of the ball in any given location. Factors affecting vertical illumination levels include the type of lamp, mounting height of the fixture, and beam spread and aiming of the fixture.

The ASBA and USA Pickleball recommend maintained average levels of horizontal and vertical illumination as follows:

Recommended Illumination for Pickleball Facilities
Recommended Horizontal Illumination

| Performance Criteria | Category I | Category II | Category III |
|---|---|---|---|
| Average Maintained Horizontal Foot-candles within PPA (1, 2, 4) | 75 (750 lux) | 50 (500 lux) | 30 (300 lux) |
| Minimum Maintained Horizontal Foot-candles within PPA (2, 4) | 60 (600 lux) | 40 (400 lux) | 20 (200 lux) |
| Maximum Uniformity Ratio (3) | 1.7 | 2.0 | 2.0 |

Several factors affect the quality of illumination, including uniformity, glare, contrast, modeling and spill. Uniformity concerns the difference in illumination levels between the darkest and lightest spots on the court. A large difference means it will be more difficult to follow the ball. A ratio of 2:1 means the brightest spot on the court is twice as bright as the darkest spot.

Color Rendering Index (CRI) is a number between 1 and 100 used to describe the ability of a light source to accurately render colors. A higher CRI rating is an indication that the light source has good color properties. For court lighting, it is recommended that the light source have a CRI rating between 65 and 80.

Correlated Color Temperature (CCT) describes the overall color appearance of a light source, whether it is metal halide or LED. CCT is measured in Kelvins (K). Color temperature is used to describe the overall color tone of a white light source. Warmer light sources will have a lower Kelvin temperature and cooler light sources will have a higher Kelvin temperature. It is recommended that light sources for court lighting have a color temperature range from 3800K to 5000K.

Light sources with a color temperature exceeding 5000K will have a "bluish" tint and should not be used for court lighting.

Glare is harsh, bright, dazzling light, and perception of it can vary from person to person. On the court, glare can affect a player's ability to follow the flight of the ball. Glare can be caused by the fixtures themselves or by reflective surfaces.

Contrast is the relative difference between light and dark areas, achieved by using colors that reflect different quantities of light. For instance, a white ball will have a high "reflectance" against the low reflectance of a dark court color and dark windscreens.

Modeling is the ability of the light to reveal the three-dimensional image of an object, such as a ball in flight. "Flat" lighting, as opposed to "directional" lighting, produces no shadows, making it difficult to see the spin or direction of the ball.

Spill, also called light pollution, is the amount of light that falls outside the area where it is intended. Factors affecting light spill may include the type of lamp, fixture, mounting height, use of reflectors or shields on the fixture, and aiming angles. Communities often have regulations regarding how much light may be "spilled."

Since the ball in pickleball travels fast in a small area, having the proper lighting—and enough lighting—is essential, especially for indoor pickleball courts. For new or renovated indoor facilities, court lighting can be either direct, indirect or a combination of both. Direct lighting systems direct the light downward onto the court surface. While direct lighting produces better 3-D definition (modeling), it has greater potential to create glare, so prior art suggests avoiding placing these direct lighting fixtures directly over the court, so that players do not look into them during play.

Indirect lighting systems have fixtures aimed upward at a highly reflective ceiling. Conventional wisdom suggests that an entirely indirect lighting system produces uniform illumination and provides the least amount of glare. However, because it is essentially "shadowless," it provides little modeling, which might make it difficult for players to detect spin or the direction of the ball.

In contrast, conventional wisdom suggests that a possible drawback of a direct-only lighting system is that the low illumination of the ceiling surface can create a "cave" effect. For this reason, conventional wisdom suggests that indoor pickleball facilities paint the ceilings and walls white, or other light neutral colors. Indeed, some court builders recommend a white ceiling surface with high reflectance a minimum reflectance value of 80%.

A combination direct/indirect system may provide the best set of lighting characteristics for indoor facilities. Generally, USPA recommends that an indoor pickleball court aim for 30% to 40% of total light distribution from the indirect component, in order to make the facility appear spacious and open. The direct component will improve modeling and ball definition.

For indoor courts, there are many options for quality of lights and type of fixtures. Owners should discuss lamp technologies with a lighting specifier to see what will work best, including maintenance that will be required.

USAP and ASBA recommend a 30' height above the court for light fixtures, with a minimum height of 20'. USAP and ASBA also recommend that light fixtures do not extend over the lines of the court. The fixtures may, however, extend over the Primary Playing Area (PPA) that extends 2' beyond the sidelines and 2' behind the baseline.

Although LED lighting is now preferred in new indoor sports facilities, when renovating existing facilities with fluorescent or metal halide lighting systems, owners and operators need to consider their options. Fluorescent lighting that turns on instantly, has good color rendering, is low in glare and has lamps that last up to 40,000 hours might be worth keeping. Metal halide, which is slow to turn on, eats up more power, and has lamps that last only about a quarter of the lifetime of fluorescent lamps may well be worth replacing with new LED lights.

The current known prior art suggests that the best combination of performance characteristics is provided by a direct/indirect system. At least 30% of the total light distribution should be provided as the indirect component; 40% is preferred. The indirect component of the lighting system makes the facility appear spacious and open by adding luminance to the ceiling and upper walls and enhances the uniform distribution of light. The direct component improves modeling.

In further conventional wisdom, whenever possible, lighting fixtures should not be placed directly over the courts. Instead, per prior art, the fixtures should be located between the courts and away from the corners, so that players do not have to look directly into the lights when serving or playing a high shot. The fixtures should be located in order to achieve proper lighting levels and uniformity within the Primary Playing Area.

Conventional Indoor Pickleball Court Noise Attenuation

Excessive noise can impair hearing and may stress the heart and circulatory system. Therefore, in planning indoor athletic facilities some thought should be given to noise attenuation.

An indoor pickleball facility is normally a large space. Depending upon its design and construction, it may have a substantial potential for reflecting (echoing) and amplifying sound. Add noise—such as the repeated striking of a hard plastic, hollow, pickleball with a flat wooden paddle, the squeak of shoes on the floor, teammates calling strategy and encouragement to one another, and possibly the noise of an enthusiastic crowd of fans—and the sound inside the facility become excessive.

Sound is generally measured in decibels (dB), a ratio which compresses the large range of sound pressures which can be perceived by the human ear to a more manageable number. Because the human ear perceives low frequency sounds differently than it does high frequency sounds (a lower frequency sound does not seem as loud as a higher frequency sound at the same pressure), a weighting scale, called the A scale, takes into account the way the ear responds to sound. For reference, a whisper might be measured at 20 dBA, a noisy restaurant at 80 dBA and a rock concert at 120 dBA.

There is no absolute level of acceptable noise. What might be acceptable to one person might not be comfortable for another. What is tolerable in the middle of the afternoon might be intolerable in the middle of the night. As a guideline, OSHA limits continuous sound exposure to 100 dB for one hour, 95 dB for 4 hours, 92 dB for 6 hours and 90 dB for 8 hours.

Reducing noise is difficult. A reduction of 3 dBA (the smallest difference a human can perceive) requires a 50% reduction in sound energy. There are three principal means of noise attenuation: sound barriers, sound absorbers and vibration dampers. Any or all of these may be used in an indoor pickleball facility.

The ability to absorb sound is measured in the form of an absorption coefficient (a). The absorption coefficient can vary from 0 to 1. If a=0.9, then the material absorbs 90% of the sound energy which strikes it.

Accordingly, there is a need for improvements to many different aspects of indoor pickleball courts, including the court surface; ingress and egress vs. space utilization; lighting; and noise reduction.

SUMMARY

Embodiments disclosed herein relate to improvements in lighting for indoor sport courts. In particular, embodiments disclosed herein relate to a system for using direct lighting fixtures, positioned withing the outer perimeter of glare-reducing sound baffles, in combination with dark colored walls and ceilings, for indoor pickleball courts.

In one aspect of the present disclosure, a glare-reducing lighting system for an indoor pickleball court includes a hanging noise baffle grid and a hanging downwardly directed light fixture. The hanging downwardly directed light fixture is positioned within an outside perimeter of the hanging noise baffle grid. A ceiling and walls of the indoor pickleball court are black.

In some embodiments, the hanging noise baffle grid is positioned between about 18 feet and about 20 feet above the indoor pickleball court. In some embodiments, the hanging downwardly directed light fixture has a bottommost edge and the hanging noise baffle grid has a bottommost edge. In some embodiments, the bottommost edge of the hanging downwardly directed light fixture is positioned level to the bottommost edge of the hanging noise baffle grid. In some embodiments, the bottommost edge of the hanging downwardly directed light fixture is positioned above the bottommost edge of the hanging noise baffle grid. In some embodiments, a vertical distance between the bottommost edge of the hanging downwardly directed light fixture and the bottommost edge of the hanging noise baffle grid is between about 0.5 inches and about 6 inches. In some embodiments, the glare-reducing lighting system includes a plurality of the hanging noise baffle grids that form a cloud grid positioned directly over a playable surface of the indoor pickleball court. In some embodiments, the glare-reducing lighting system includes six hanging downwardly directed light fixtures. In some embodiments, all of the hanging downwardly directed light fixtures are positioned within an outside perimeter of the cloud grid. In some embodiments, the glare-reducing lighting system includes nine hanging downwardly directed light fixtures. In some embodiments, all of the hanging downwardly directed light fixtures are positioned within an outside perimeter of the cloud grid.

In another aspect of the present disclosure, a lighting system for an indoor pickleball court includes a plurality of hanging noise baffle grids and a plurality of hanging light fixtures. The plurality of hanging noise baffle grids define a cloud grid that is positioned directly above a playable surface of the indoor pickleball court. All of the hanging light fixtures are positioned within an outside perimeter of the cloud grid. A ceiling and walls of the indoor pickleball court are black. An indirect lighting is less than 40% of a total light distribution on the indoor pickleball court.

In some embodiments, each of the plurality of hanging light fixtures has a bottommost edge, and the cloud grid has a bottommost edge. In some embodiments, the plurality of hanging light fixtures is hung such that each of their respective bottommost edges is positioned equal to or above the bottommost edge of the cloud grid. In some embodiments, the plurality of hanging light fixtures includes between six and nine hanging light fixtures. In some embodiments, each of the plurality of hanging light fixtures are positioned at least about 7 feet from each other. In some embodiments, the cloud grid is positioned between about 18 feet and about 20 feet above the indoor pickleball court. In some embodiments, indirect lighting is less than 15% of the total light distribution on the indoor pickleball court. In some embodiments, each of the plurality of hanging light fixtures is positioned inside a different hanging noise baffle grid.

In another aspect to the present disclosure, a lighting system for an indoor pickleball court includes a plurality of hanging noise baffle grids and a plurality of hanging light fixtures. The plurality of hanging noise baffle grids define a cloud grid that is positioned directly above a playable surface of the indoor pickleball court. All of the hanging light fixtures are positioned within an outside perimeter of the cloud grid. Each of the plurality of hanging light fixtures has a bottommost edge, and the cloud grid has a bottommost edge. The plurality of hanging light fixtures is hung such that each of their respective bottommost edges is positioned equal to or above the bottommost edge of the cloud grid. The cloud grid is positioned between about 18 feet and about 20 feet above the indoor pickleball court. A ceiling and walls of the indoor pickleball court are black. Indirect lighting is less than 40% of a total light distribution on the indoor pickleball court.

BRIEF DESCRIPTION OF THE DRAWINGS

In the descriptions that follow, like parts or steps are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein.

DESCRIPTION OF THE EMBODIMENTS

While the systems disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximate" mean plus or minus 5% of the number or value that each term precedes. As noted herein, all ranges disclosed herein are inclusive of the outer bounds of the range.

With reference to FIGS. 9-37, multiple embodiments of a new glare-reducing lighting system for an indoor pickleball court is disclosed. Some aspects of these embodiments may be applicable to any indoor sports facility, but other aspects are specifically tailored to an indoor pickleball facility.

Figure 1:
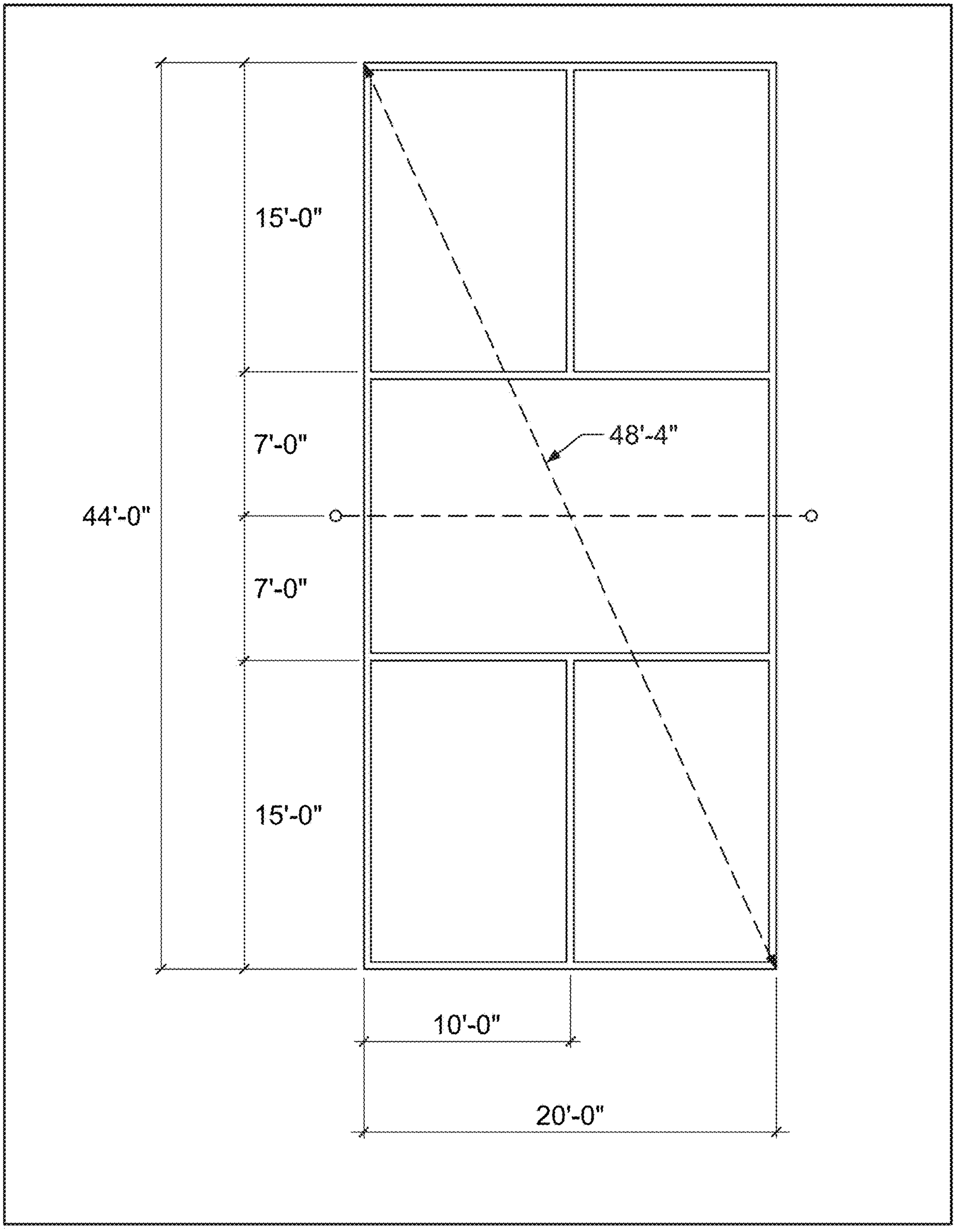
FIG. 1 (Prior Art)
FIG. 1 (Prior Art) illustrates the basic layout and lines of a pickleball court.
Figure 2A:
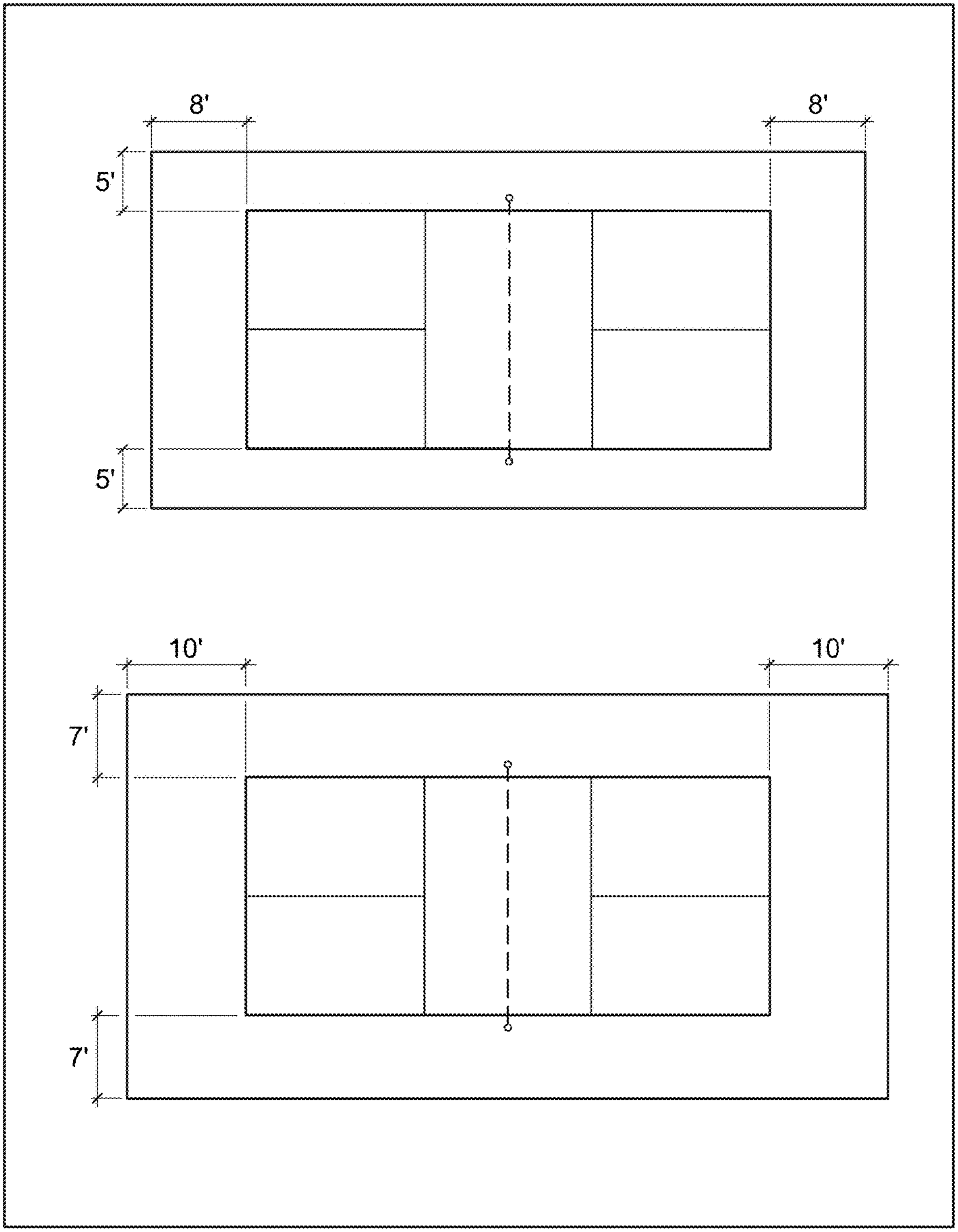
FIG. 2A (Prior Art)
FIGS. 2A-C (Prior Art) illustrate the overall sizes of pickleball courts, including both the playable surface and applicable overruns for different levels of competition and layout.
Figure 2B:
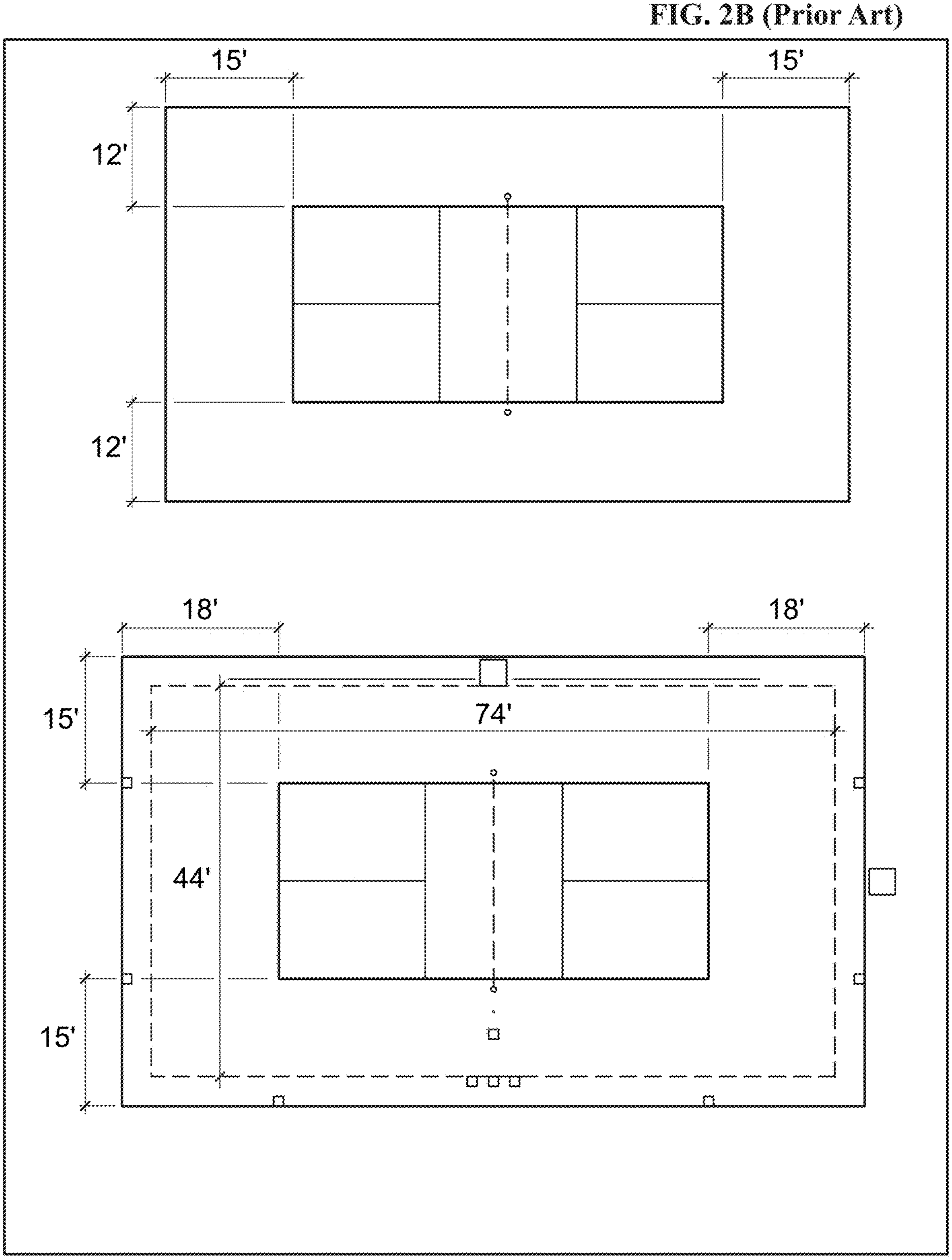
FIG. 2B (Prior Art)
Figure 2C:
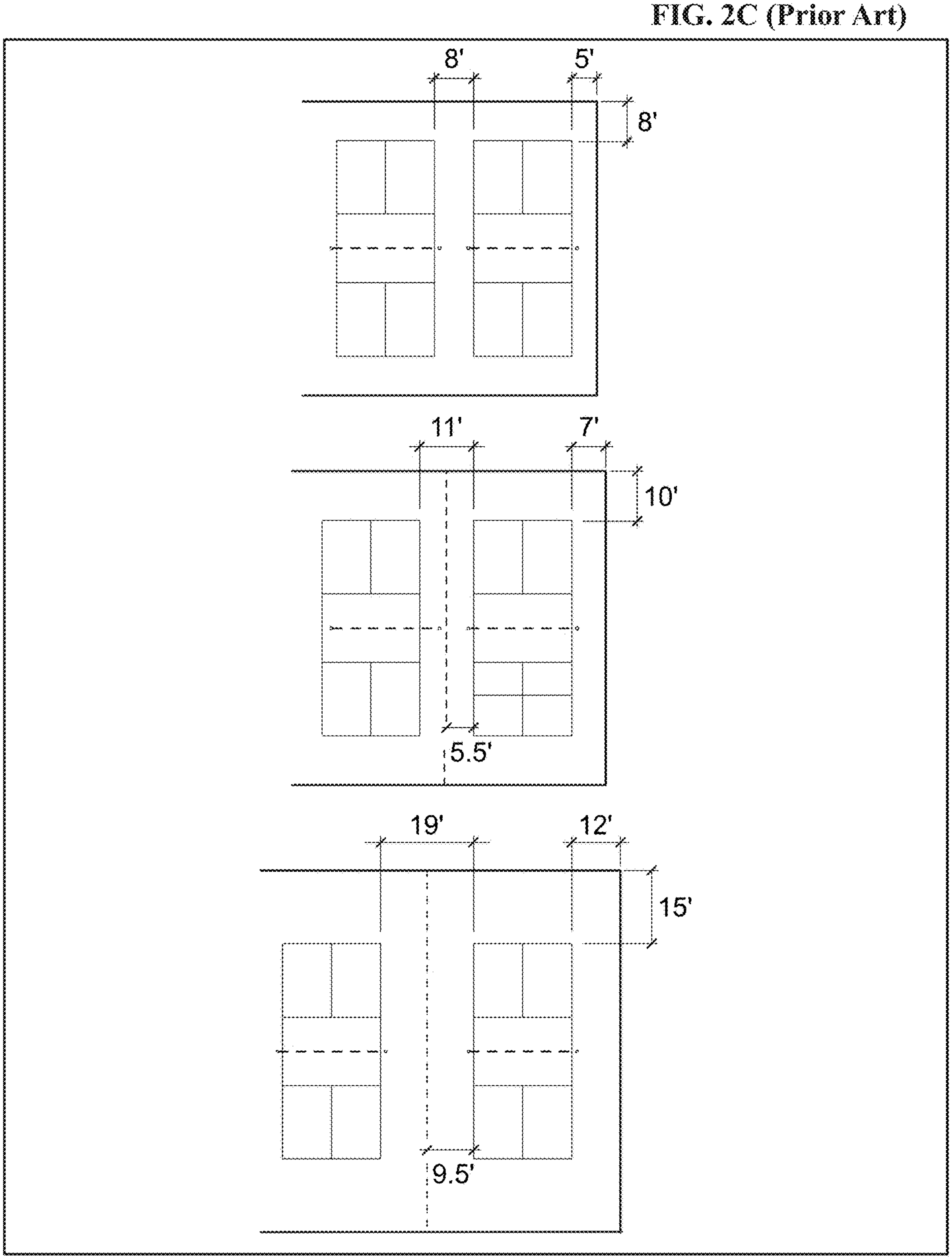
FIG. 2C (Prior Art)
Figure 3:
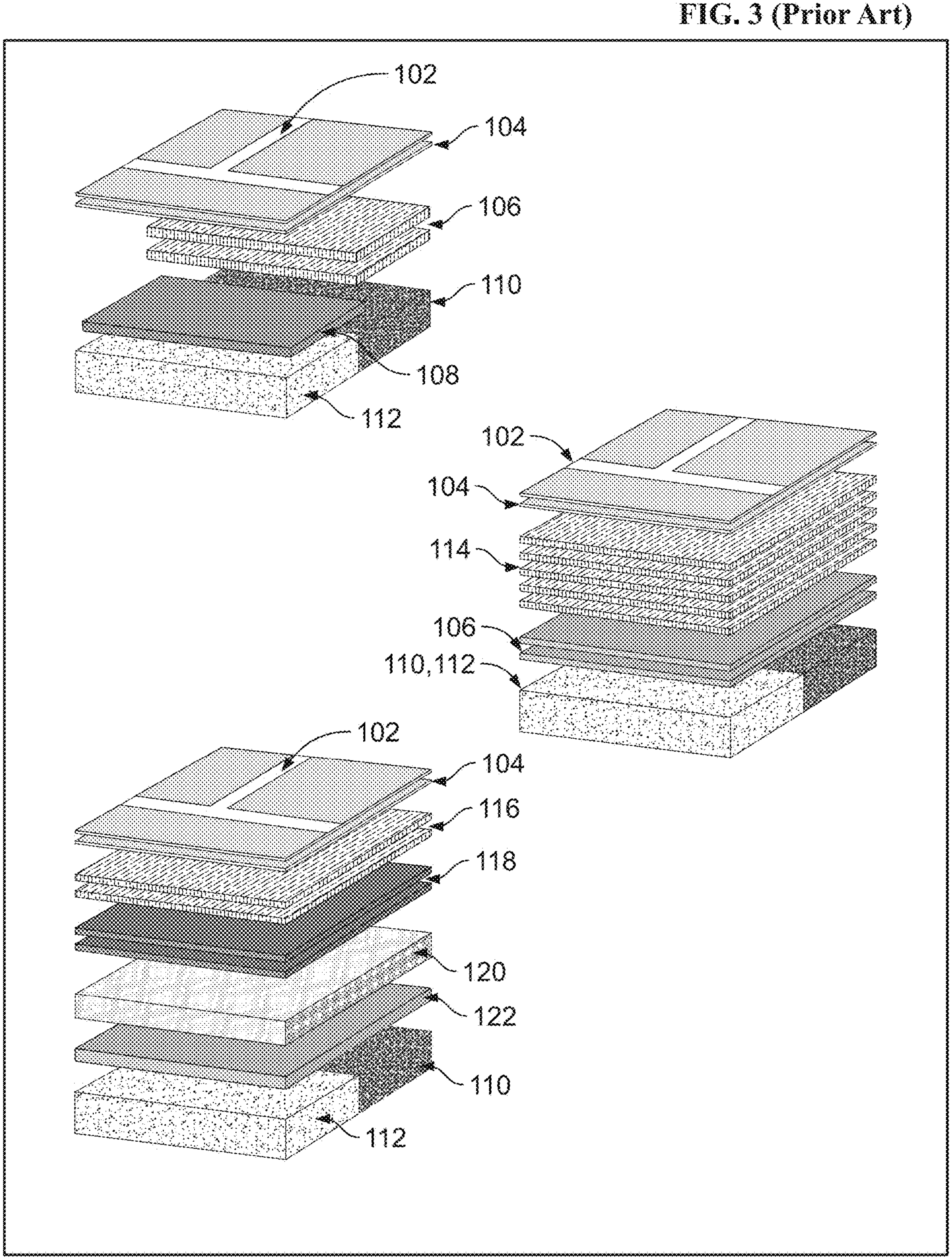
FIG. 3 (Prior Art)
FIGS. 3 (Prior Art) illustrates prior art acrylic court surface systems.
Figure 4A:
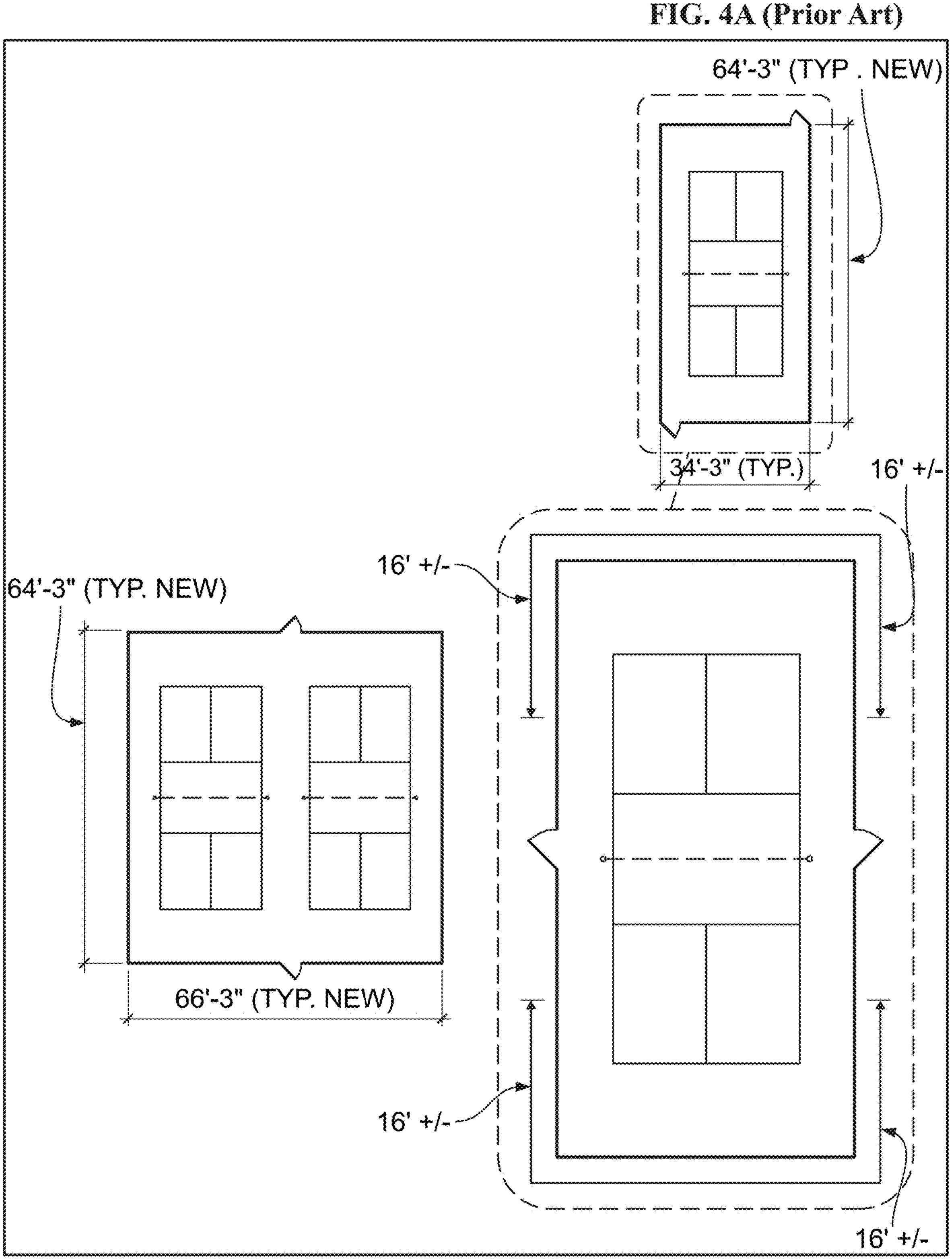
FIG. 4A (Prior Art)
FIGS. 4A-C (Prior Art) illustrate prior art pickleball court fencing and gate placement, in both plan view and elevational view.
Figure 4B:
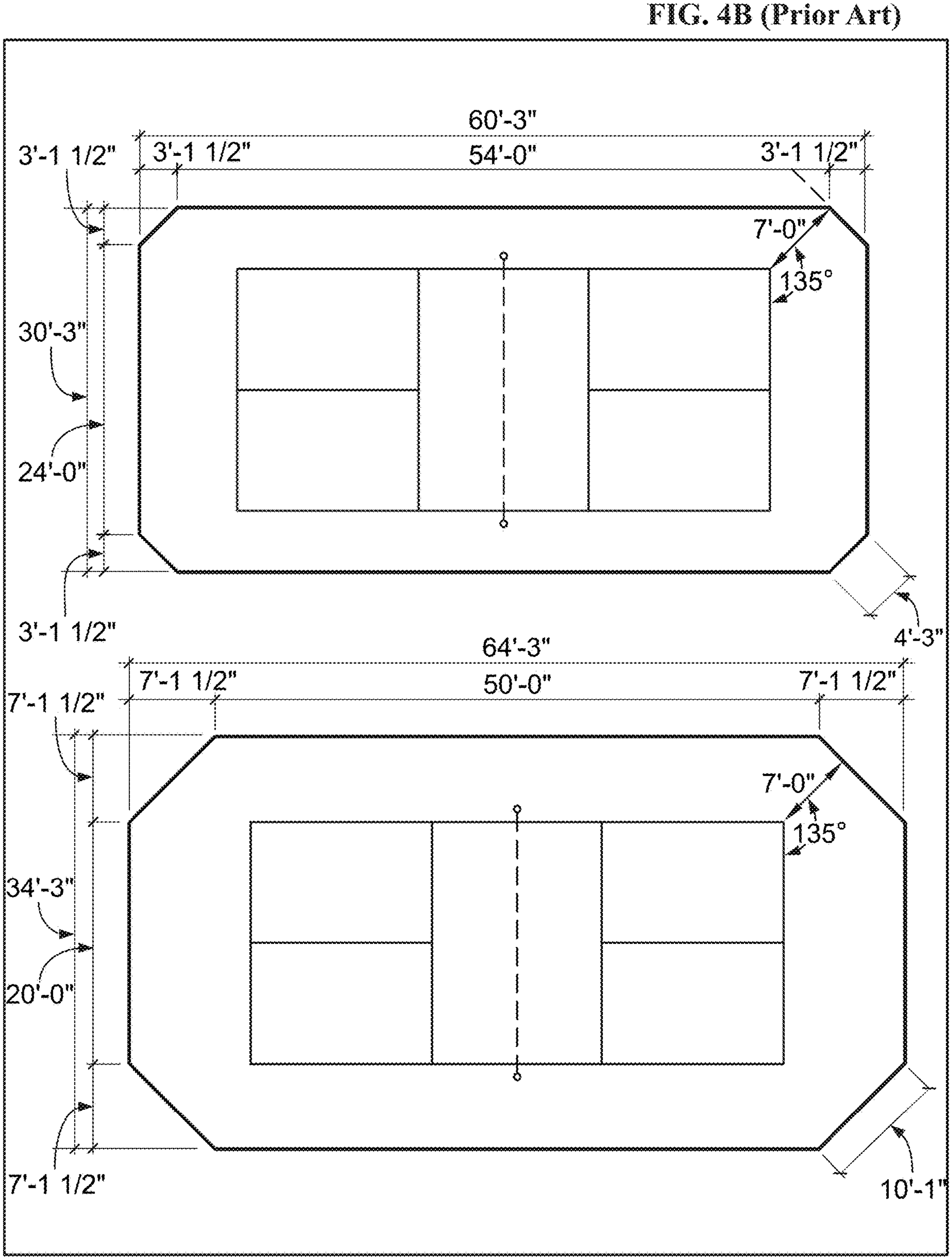
FIG. 4B (Prior Art)
Figure 4C:
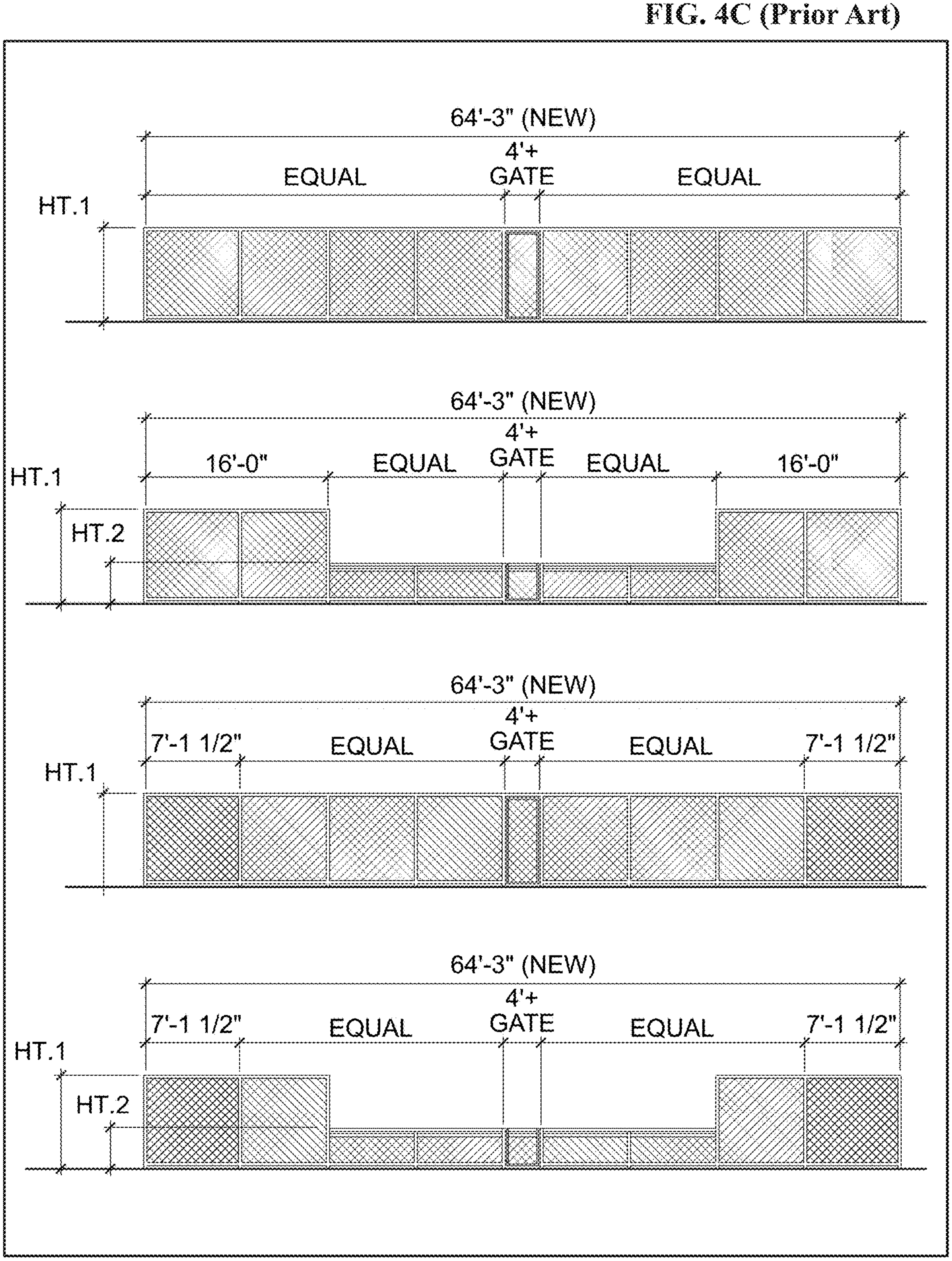
FIG. 4C (Prior Art)
Figure 5:
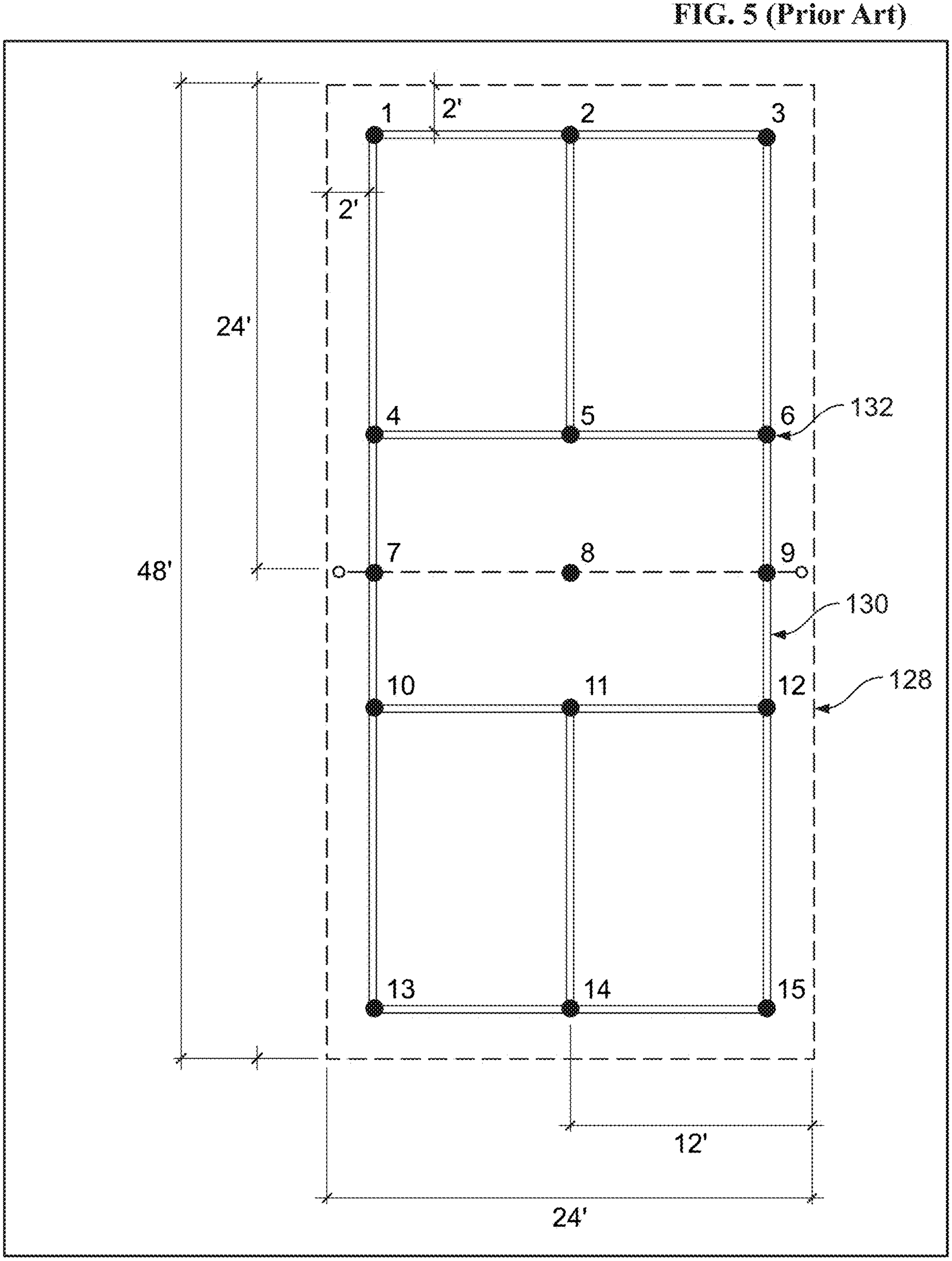
FIG. 5 (Prior Art)
FIG. 5 (Prior Art) illustrates a plan view of a prior art pickleball court with prior art light meter measurement points at specific locations around the court.
Figure 6:
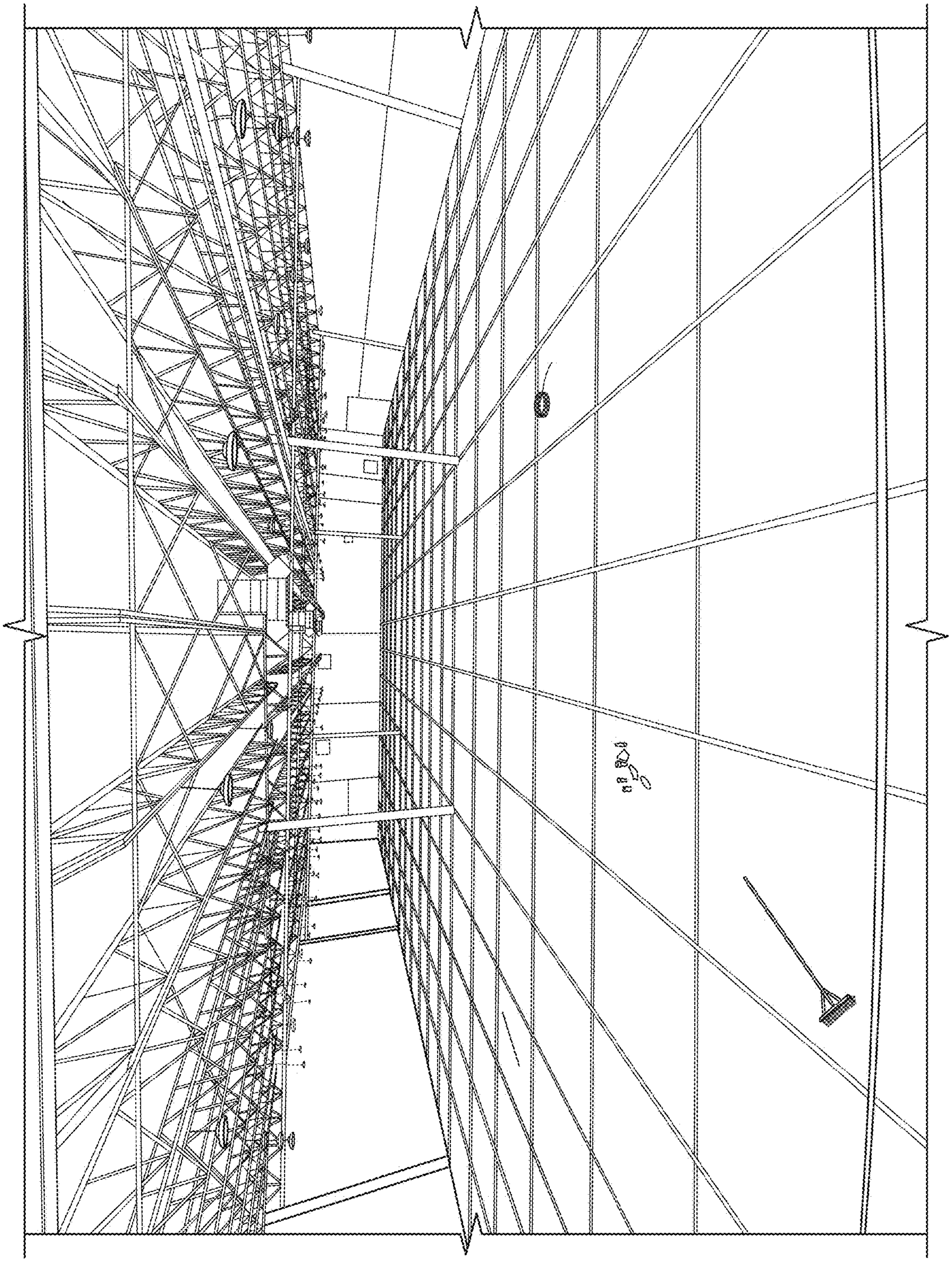
FIG. 6 is an image of an indoor space, with a newly-cured concrete floor, on which seams and imperfections are visible.
Figure 7:
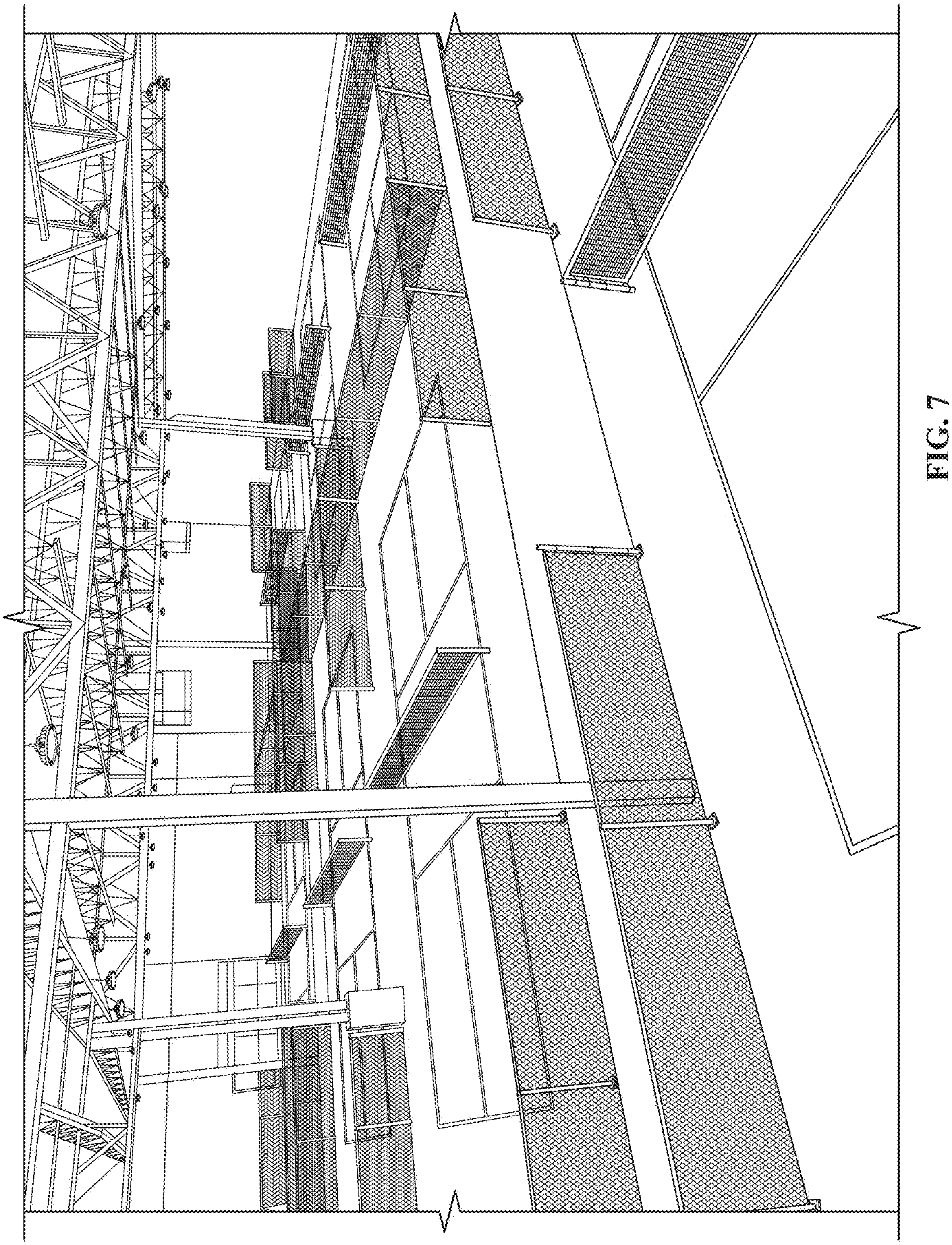
FIG. 7 is an image of the same indoor space, showing completed pickleball courts.
Figure 8:
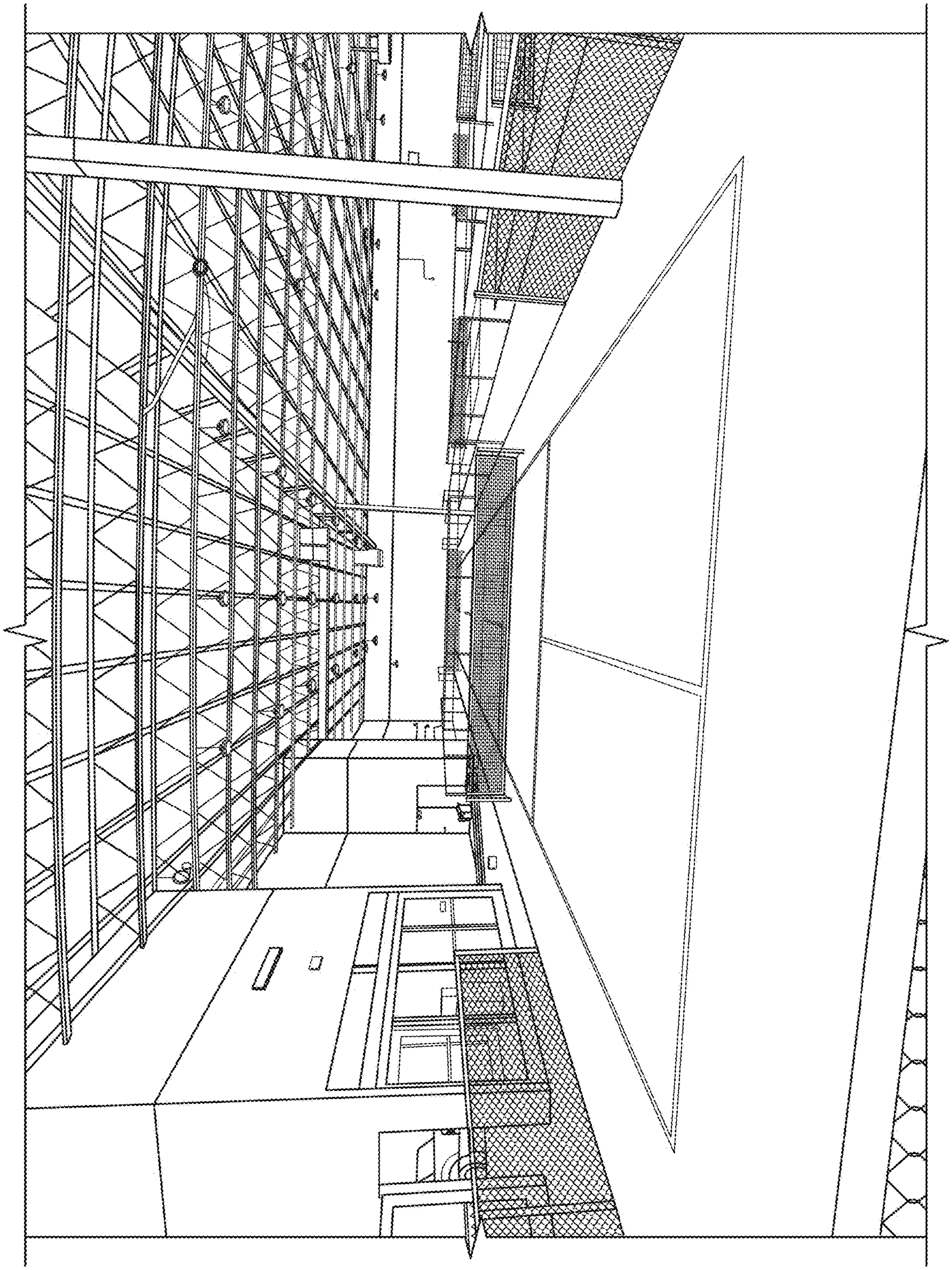
FIG. 8 is another image of the completed pickleball courts from a different angle.
Figure 9:
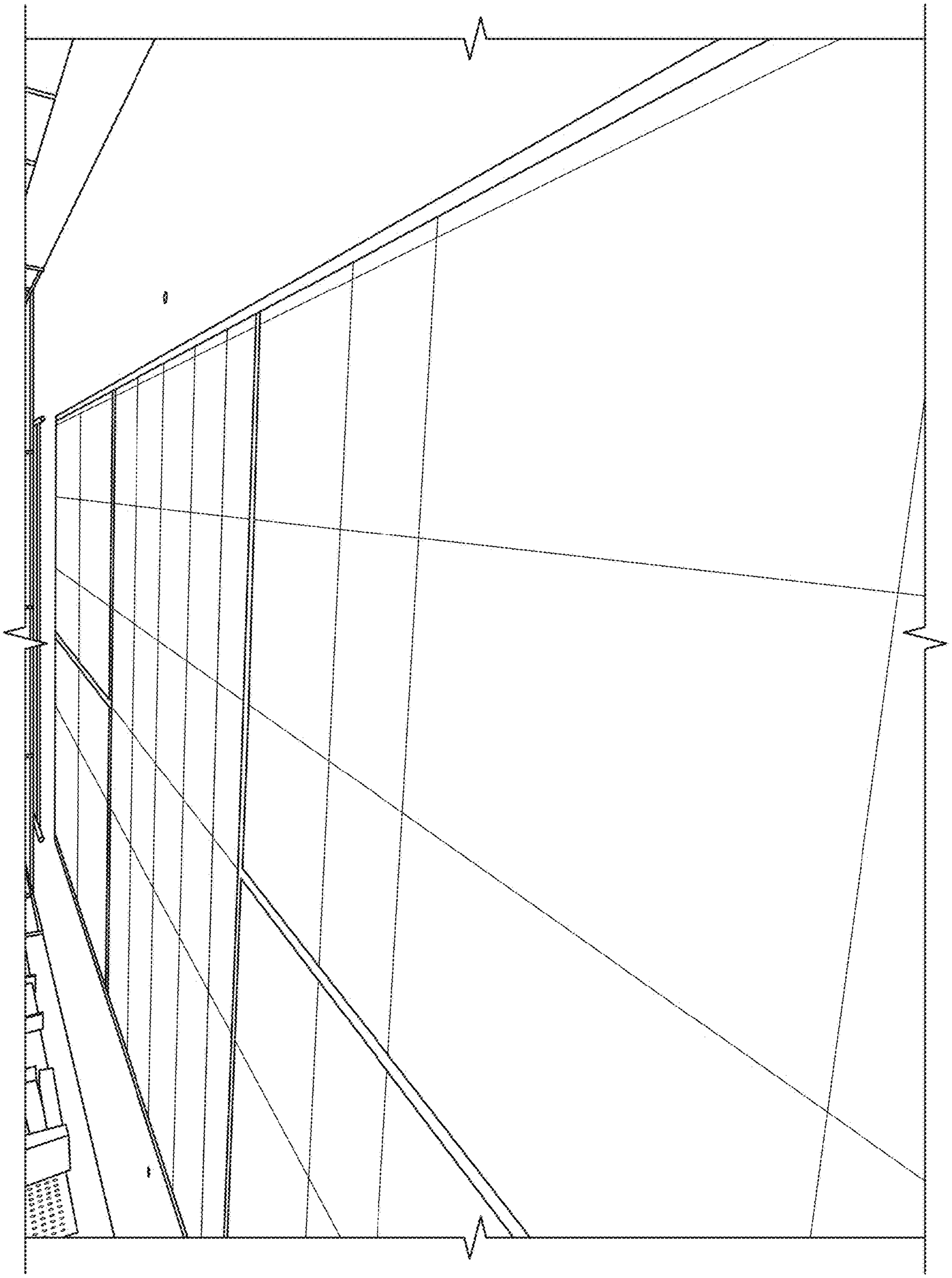
FIG. 9 is an image of a pickleball court surface upon which a grid has been drawn using chalk lines.
Figure 10:
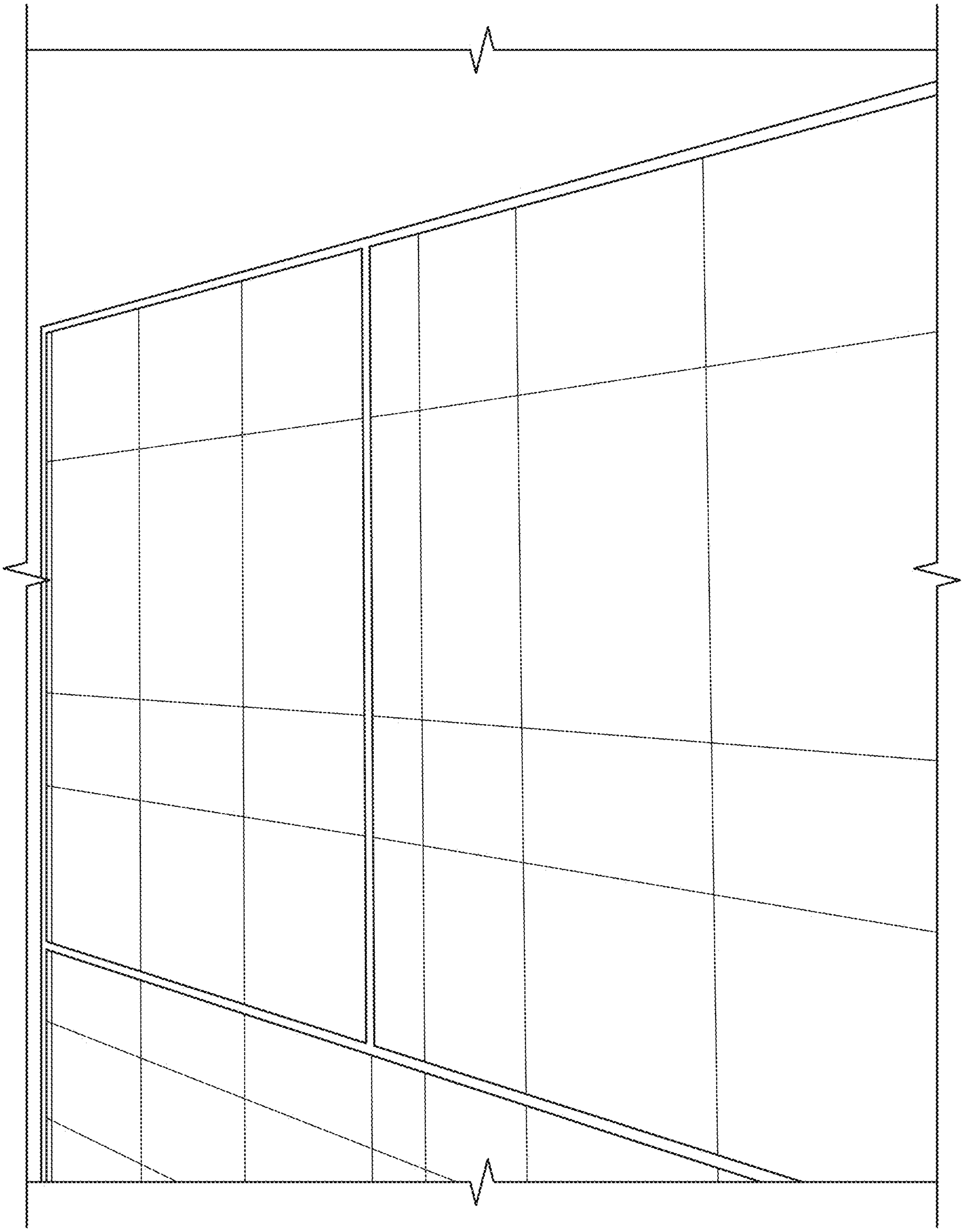
FIG. 10 is an image of the same pickleball court surface of FIG. 9, showing a closer view of the grid of chalk lines.

With reference to FIG. 6, a new indoor concrete pad is laid for the construction of an indoor pickleball facility. With reference to FIGS. 7 and 8, the court surfaces, nets, and fencing are shown. The size, and the open "warehouse-like" nature of a typical indoor pickleball facility, is illustrated by FIGS. 6-8. Moreover, these figures show that in a typical indoor pickleball facility, with indirect lighting mounted near the ceiling rafters without regard to the position of the lights with respect to the court playing areas. Further, these figures show that the typical indoor pickleball facility has painted walls and ceilings in a light neutral—or white—color, as suggested by the USAP and ASBA. As explained herein, this configuration can make it hard to adequately light the court playing area, while simultaneously reducing glare for players looking upward and increasing the visibility of a fast-moving pickleball.

As such, a system for adequately lighting the court playing area, while simultaneously reducing glare for players looking upward and increasing the visibility of a fast-moving pickleball, is needed.

As explained further herein, Applicants have developed a system for adequately lighting the court playing area of an indoor pickleball court, while simultaneously reducing glare for players looking upward and increasing the visibility of a fast-moving pickleball. In some embodiments, the system includes a cloud grid of baffles, suspended above each pickleball court, with direct downward lighting fixtures hung within the outside perimeter of the cloud grid. In a preferred embodiment, a 20 ft×40 ft grid of 8 inch blades, each of which is made from 12 mm thick Polyethylene terephthalate ("PET"), is suspended at or about 18-20 feet above the surface of each pickleball court by wires affixed to the ceiling of the building and between six (6) and (9) direct downward lighting fixtures are hung so as to be inside the perimeter of the grid so that the court playing surface is directly lit while minimizing lateral visibility of the lighting fixtures. In a still preferred embodiment, the bottom edge of the light fixture is positioned equal to or above the bottom edge of the cloud grid. In a still further preferred embodiment, the ceiling and walls of the indoor pickleball facility are painted in dark colors, such as black, to minimize reflected light. In a still further preferred embodiment, indirect lighting of the court playing surface is minimized or eliminated entirely.

An embodiment of the noise baffle grid system, as well as a method for positioning and installing it, is disclosed and discussed with reference to FIGS. 9-33. This noise baffle grid system is also disclosed in co-pending U.S. Provisional Patent Application No. 63/657,721, filed by Applicant on Jun. 7, 2024, which is hereby incorporated by reference as if fully set forth herein.

After (or while) the pickleball court surface is being laid, a grid of chalk lines or other impermanent lines is marked on the pickleball court surface. This can be accomplished using any readily available chalk line marking product. The chalk lines, further shown in FIGS. 9-10, correspond to the dimensions of the pickleball court, the noise baffle grid system to be hung above it, and the locations of anchor points for both the noise baffle grid and lighting for the court.

Figure 11:
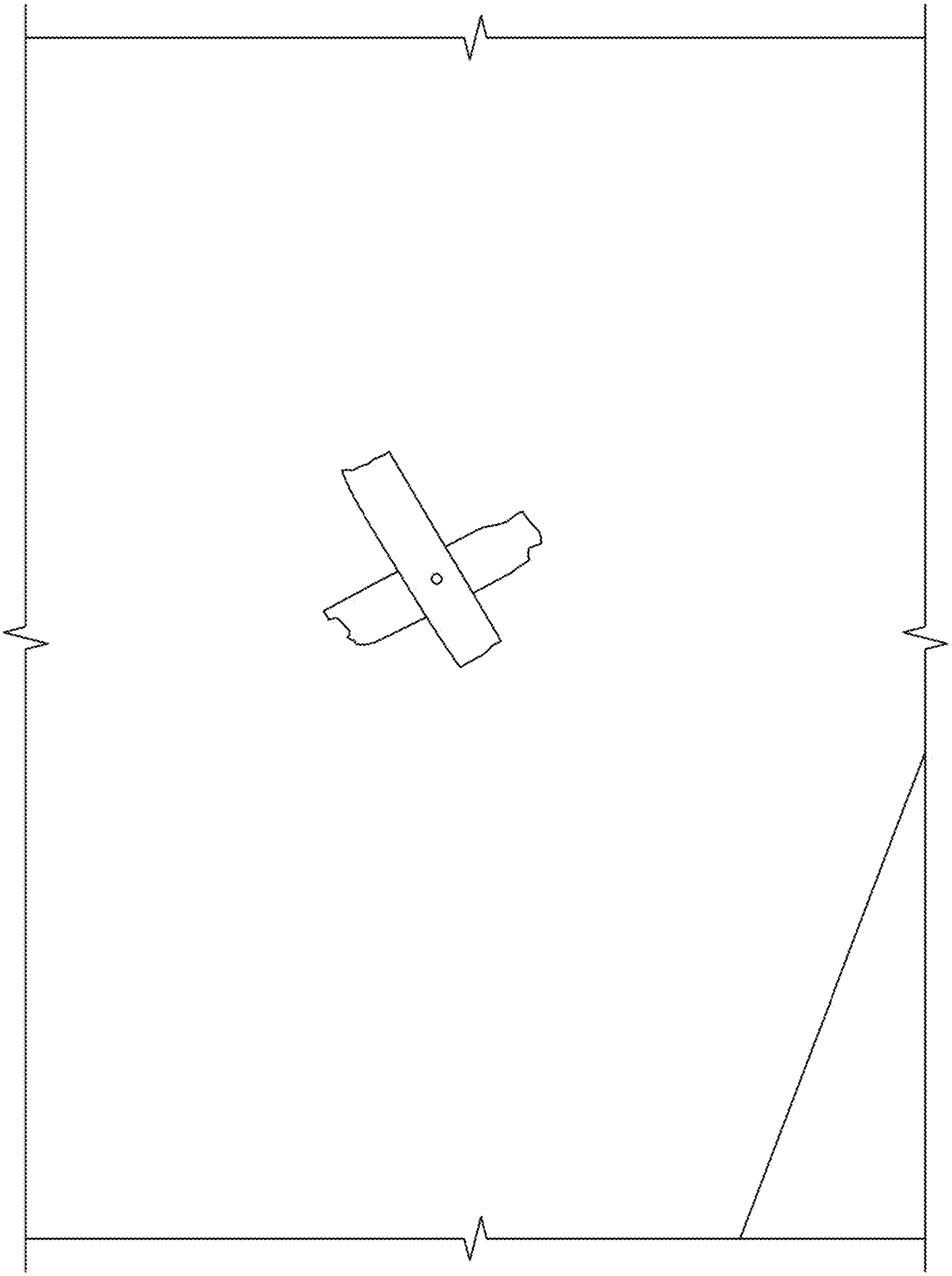
FIG. 11 is an image of a marker on the chalk grid of the pickleball court surface indicating the relative location of a light fixture with respect to the court.
Figure 12:
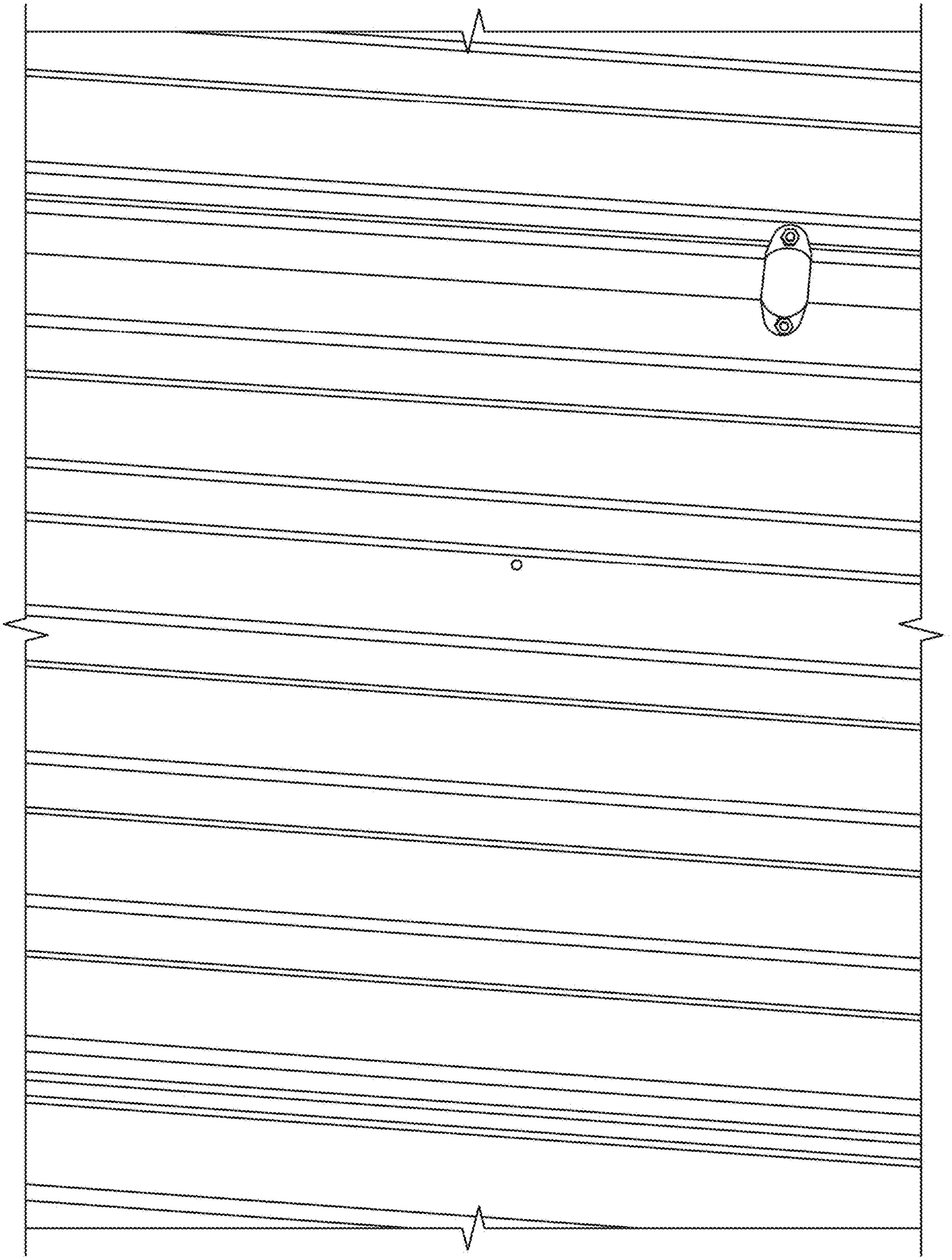
FIG. 12 is an image of the ceiling above the pickleball court surface, with a laser pointer beam, generated by a laser leveling device, projecting onto the ceiling, marking the point on the ceiling where a noise baffle grid attachment wire should be hung.

With reference to FIG. 11, the surface of the pickleball court is marked with marking tape (or other suitable impermanent markings) to indicate the location from which the pickleball court lighting fixtures will be hung from the ceiling, and thus, where the lighting fixtures will hang with respect to the noise baffle grid.

Figure 15:
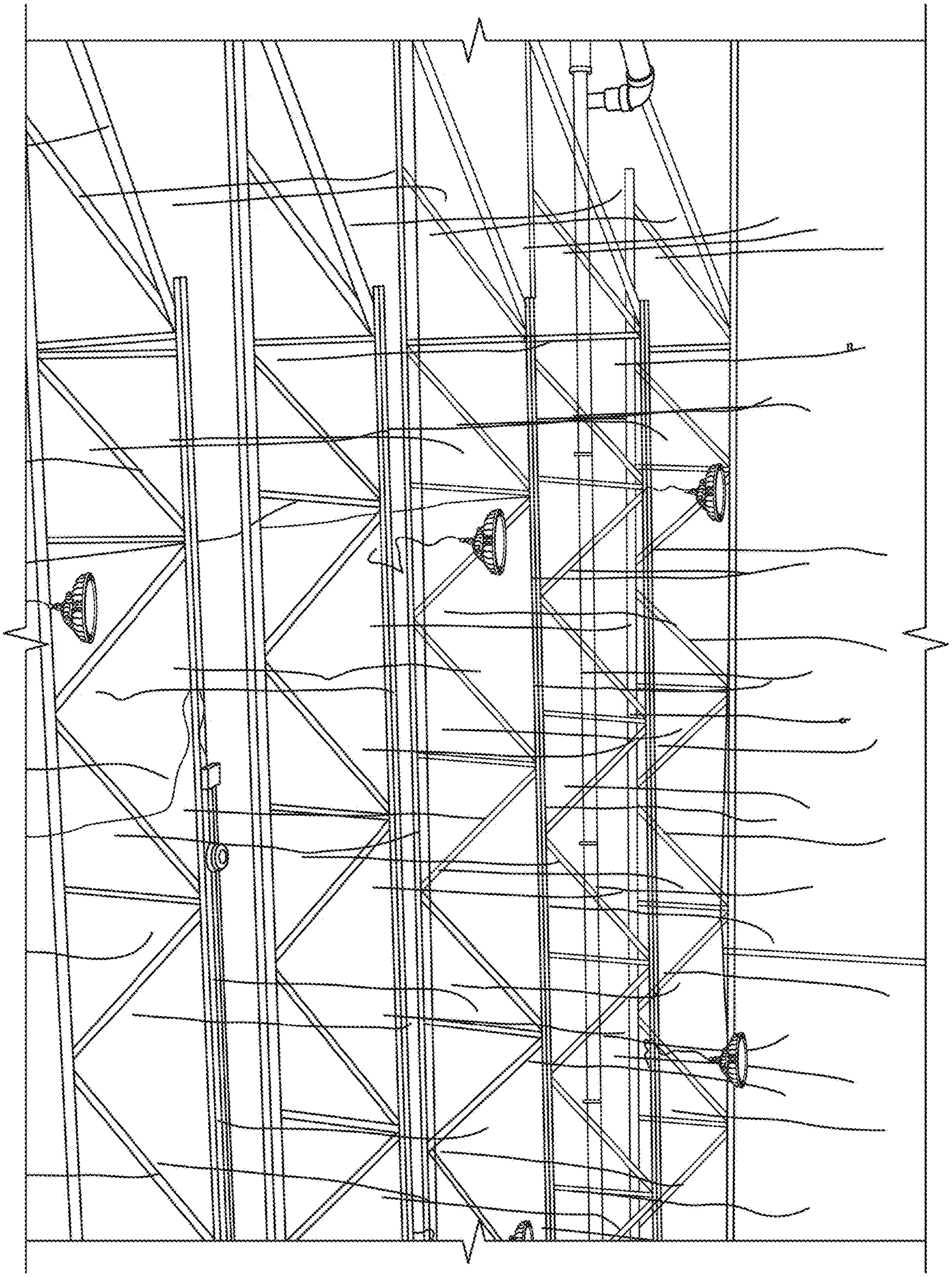
FIG. 15 is an image of the ceiling of the pickleball court facility ceiling, providing a closer view of the many noise baffle grid attachment wires have been hung.

With reference to FIG. 15, to ensure correct alignment of the noise baffle grid and light fixtures with respect to the surface of the pickleball court, a laser level/laser pointing device is set at each anchor point or light hanging point marked out by the chalk grid and/or marking tape. The laser level projects a point of laser light upward to the ceiling, so that the measurements and relative location is transferred from the chalk grid to the ceiling of the indoor pickleball facility.

Figure 13:
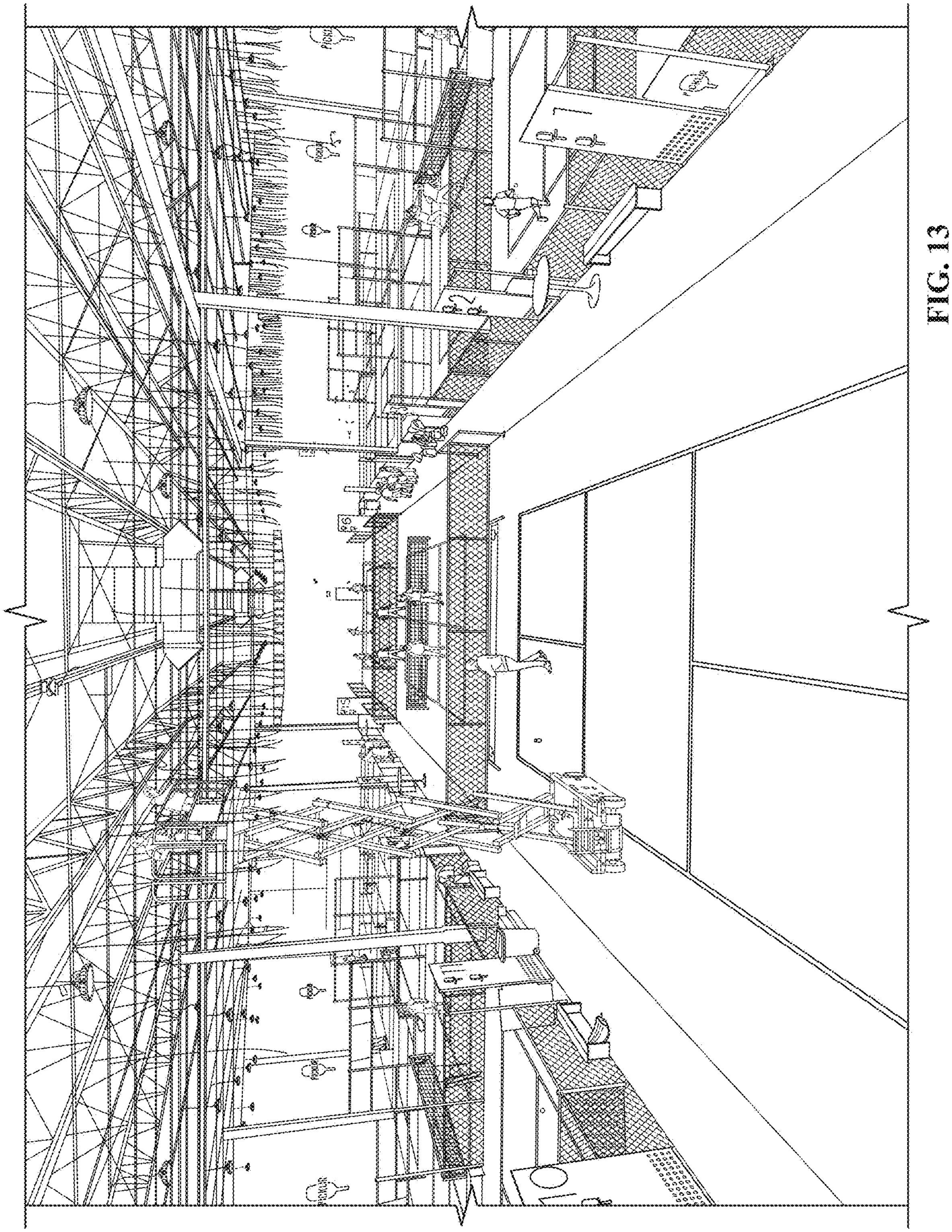
FIG. 13 is an image of the pickleball court surface and ceiling above the court, while a lift is being used by a worker to hang noise baffle grid attachment wires to the ceiling, while the laser level can be seen on the surface of the court at a chalk line grid point, near the lift.
Figure 14:
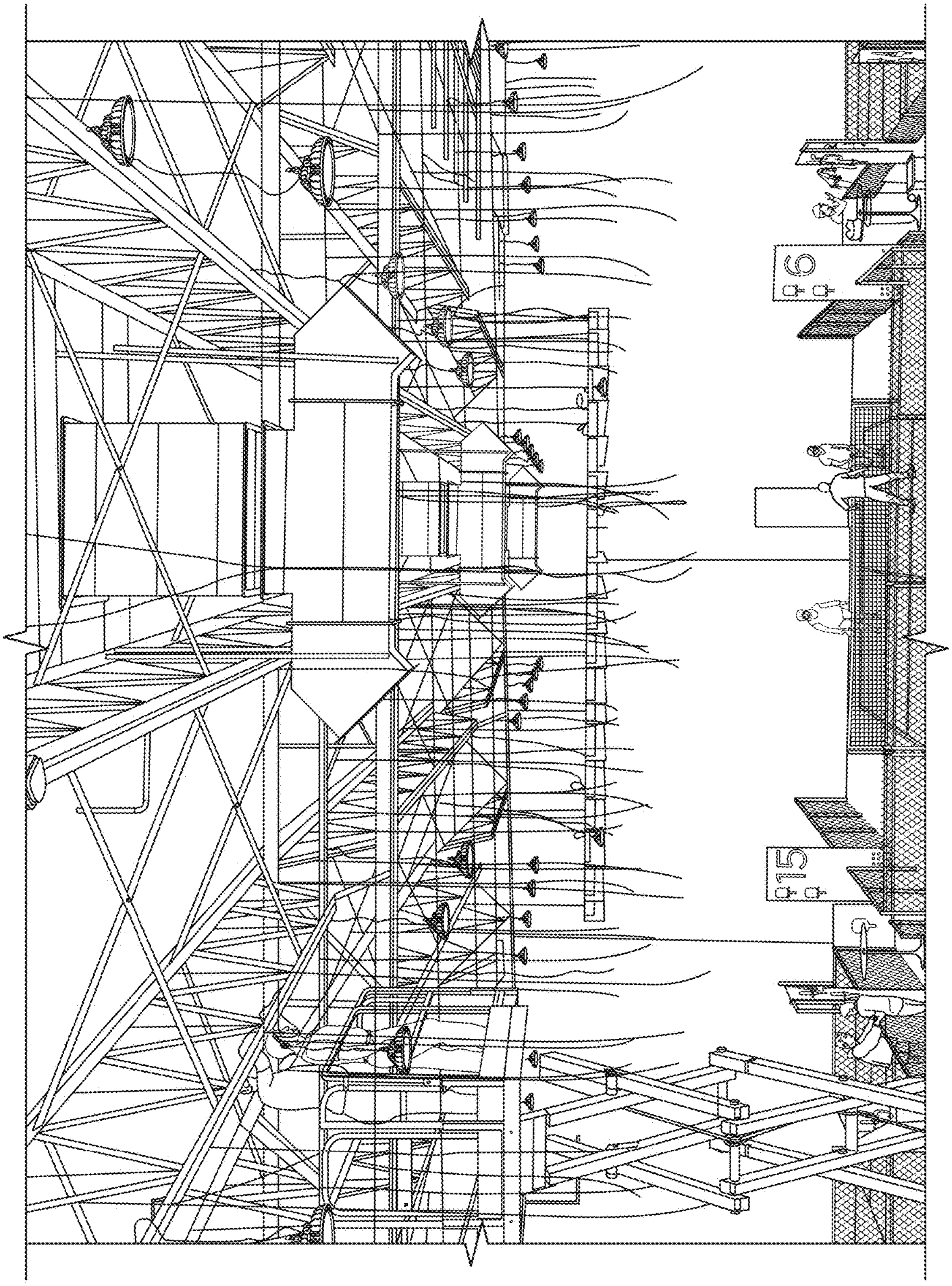
FIG. 14 is an image of the ceiling of the pickleball court facility, from which many noise baffle grid attachment wires have been hung by workers on the lift shown in the left of the image.
Figure 16:
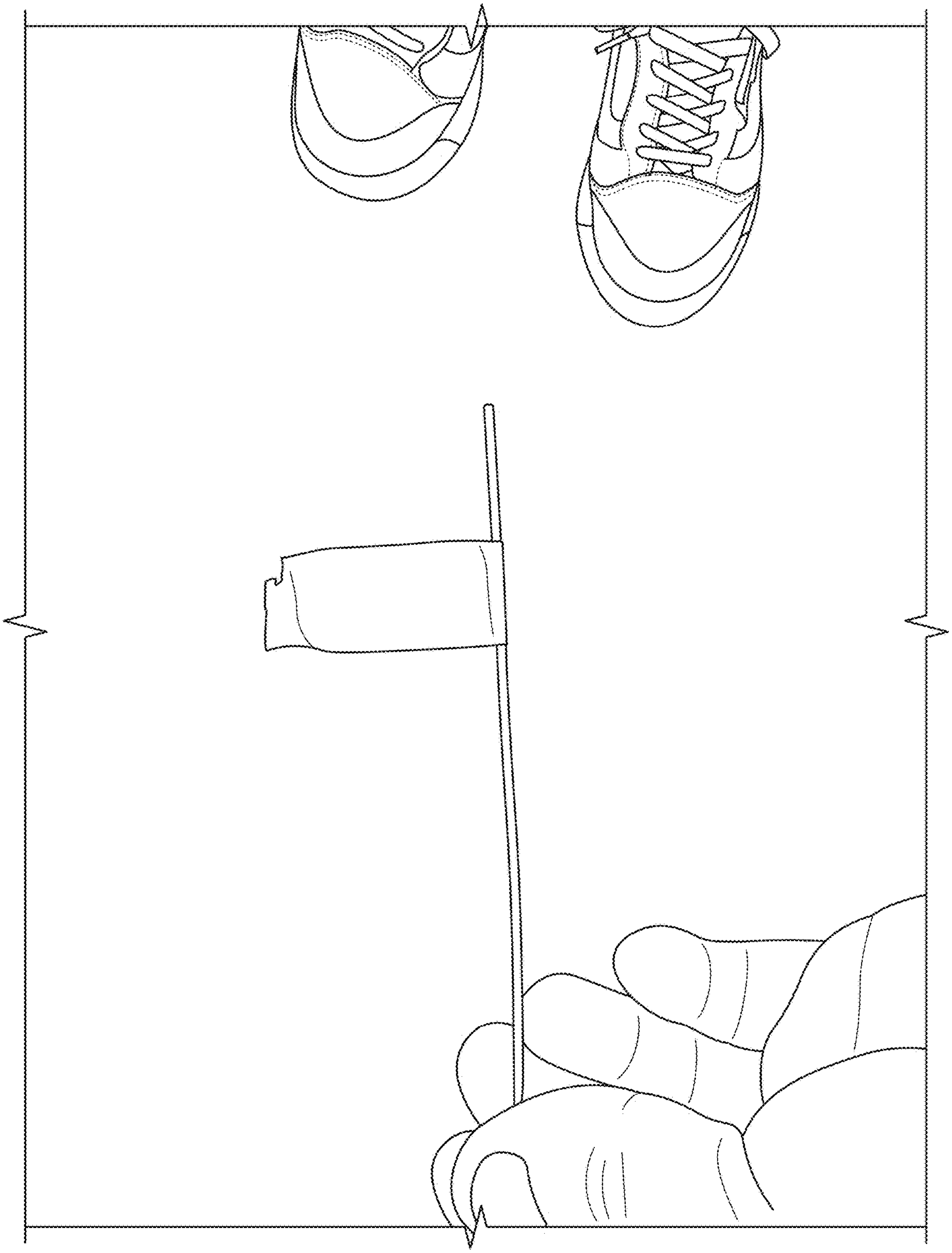
FIG. 16 is an image of a light fixture support cable, which has been marked with marker tape for identification.
Figure 17:
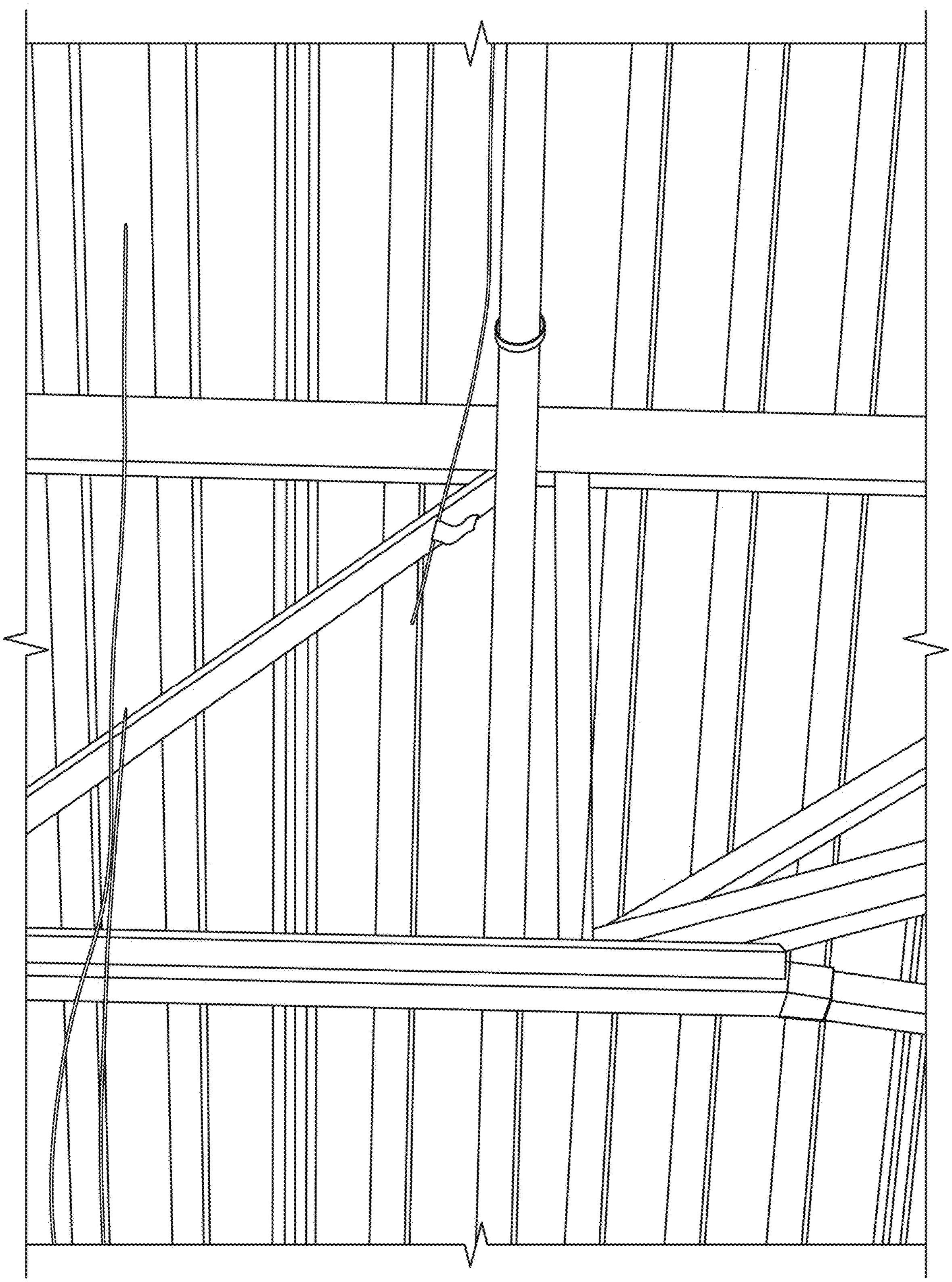
FIG. 17 is an image of the ceiling of the pickleball court facility ceiling, showing the light fixture support cable-marked with the marker tape-hanging from the ceiling in a position relative to the nearby noise baffle grid attachment wire.
Figure 18:
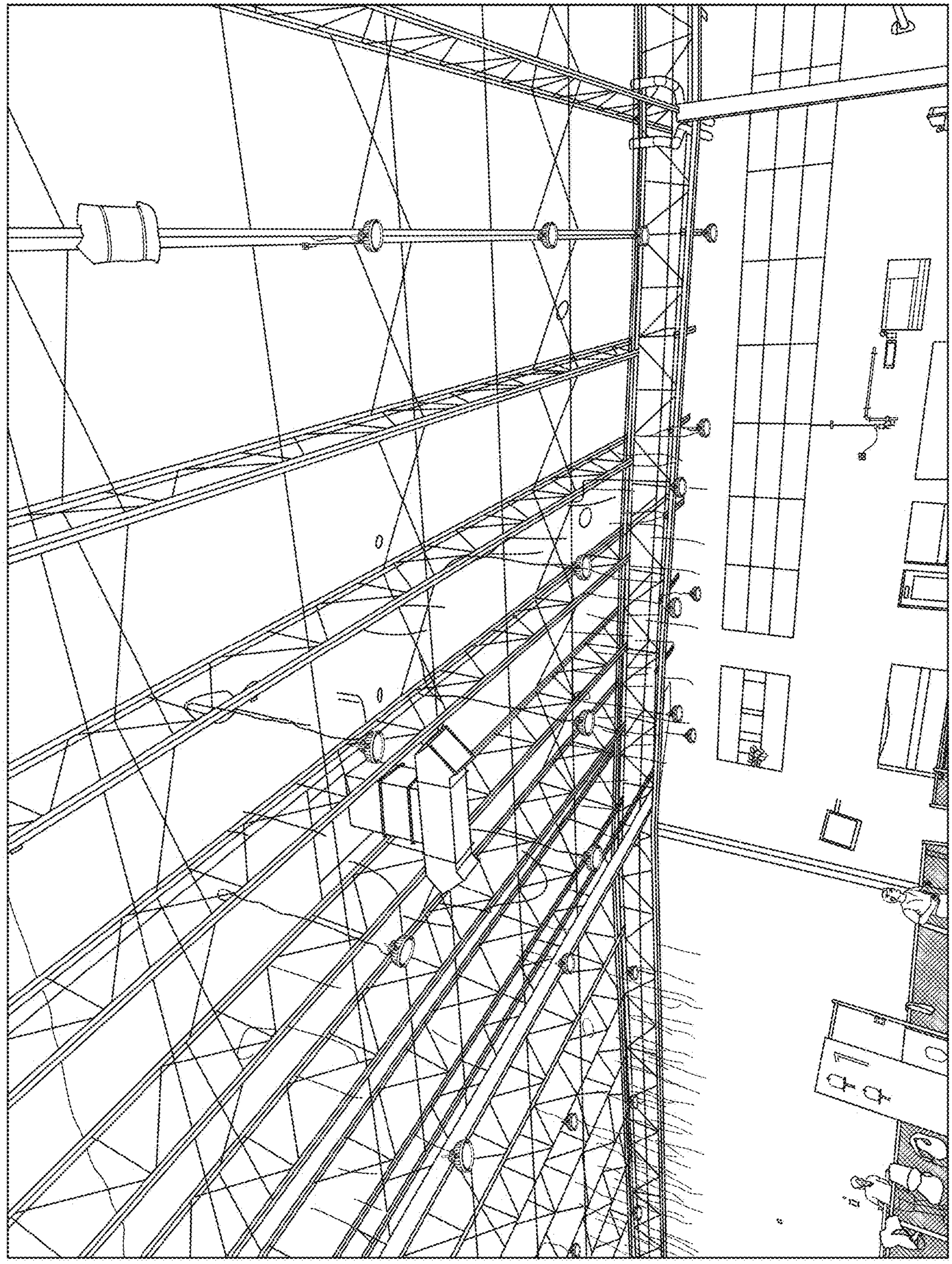
FIG. 18 is an image of the ceiling of the pickleball court facility ceiling, showing the light fixtures hung from the light fixture support cables in position such that there are nine lights per pickleball court.

Next, with reference to FIGS. 13-15, wires are affixed to each laser point marked anchor point on the ceiling. These wires are hung to a length sufficient to suspend the noise baffle grid and light fixtures approximately 18-20 feet above the pickleball court playing surface, regardless of the actual height of the ceiling in the facility. With reference to FIGS. 16 and 17, wires for hanging light fixtures should be separately marked—such as with marking tape as shown—so that the light fixture suspension wires are not confused with the wires for hanging the noise baffle grid. Then, as shown in FIG. 18, light fixtures are hung at the marked points and connected to power.

Figure 19:
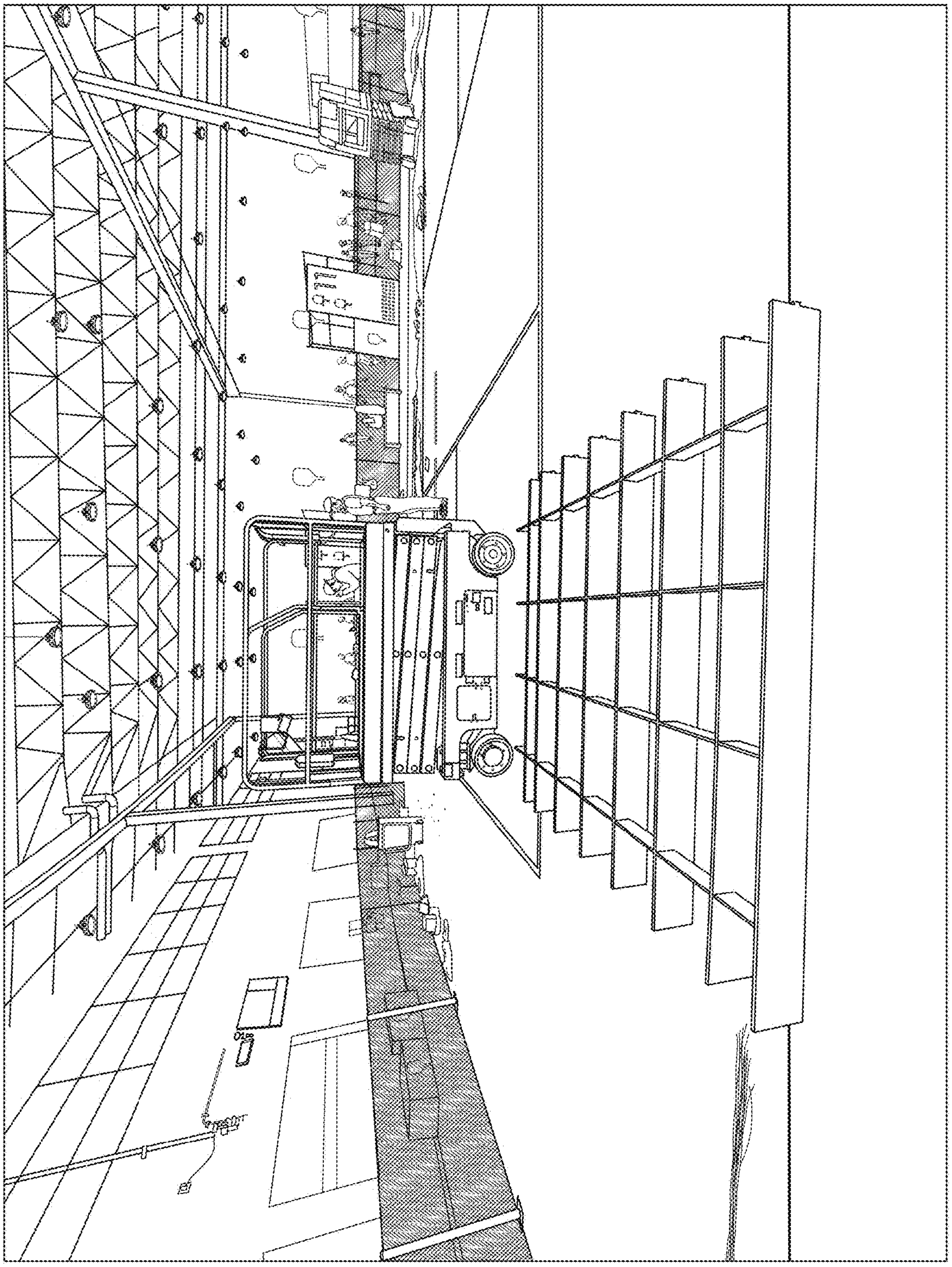
FIG. 19 is an image of a section of the noise baffle grid, assembled on the surface of the pickleball court, in preparation for hanging above the court.

Next, with reference to FIGS. 19-26, the noise baffle grids are assembled, lifted, and affixed to the previously installed wires above the pickleball court surface, in alignment with the chalk line grid. In FIG. 19, a section of the noise baffle grid has been assembled and positioned along the overrun of a court, while a mechanical lift has been positioned on the playable surface of the court in anticipation of lifting the assembled section of the noise baffle grid into place. In a preferred embodiment, the noise baffle grid for a single pickleball court is comprised of seven separate sections. This enables the sections to be separately assembled and raised, thus reducing the difficulty of installing the grid.

Figure 20:
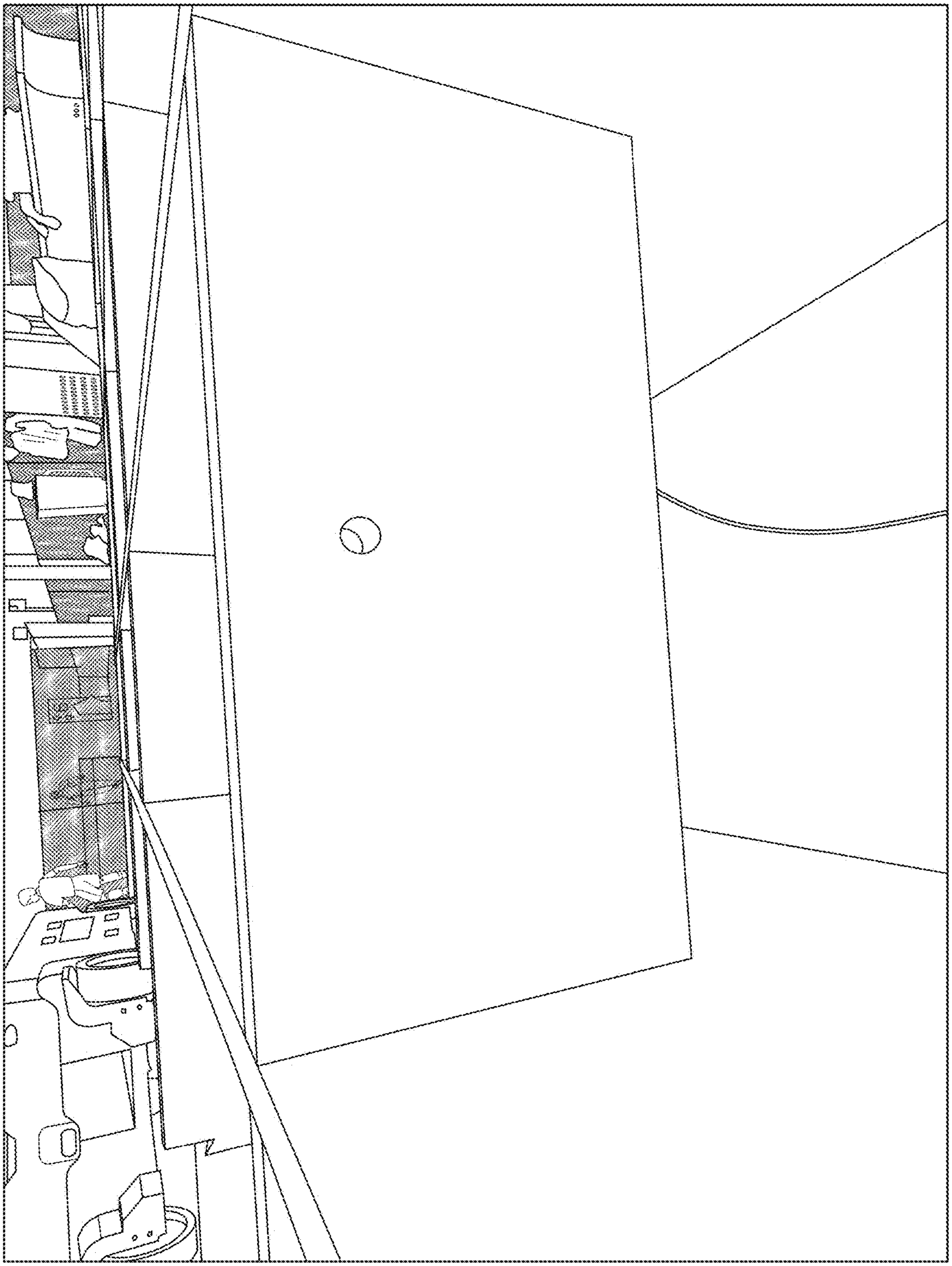
FIG. 20 is an image close-up photograph of the section of the noise baffle grid of FIG. 19, showing the position and alignment of one of the attachment holes for attaching the noise baffle grid section to the already-installed noise baffle grid support wires.

In FIG. 20, a close-up of an assembled baffle section is shown. Also visible is the anchor point alignment hole in a cross-member baffle. When raised, the previously installed support wire corresponding to the location of this anchor point alignment hole will be affixed to the cross-member baffle at this anchor point alignment hole.

Figure 21:
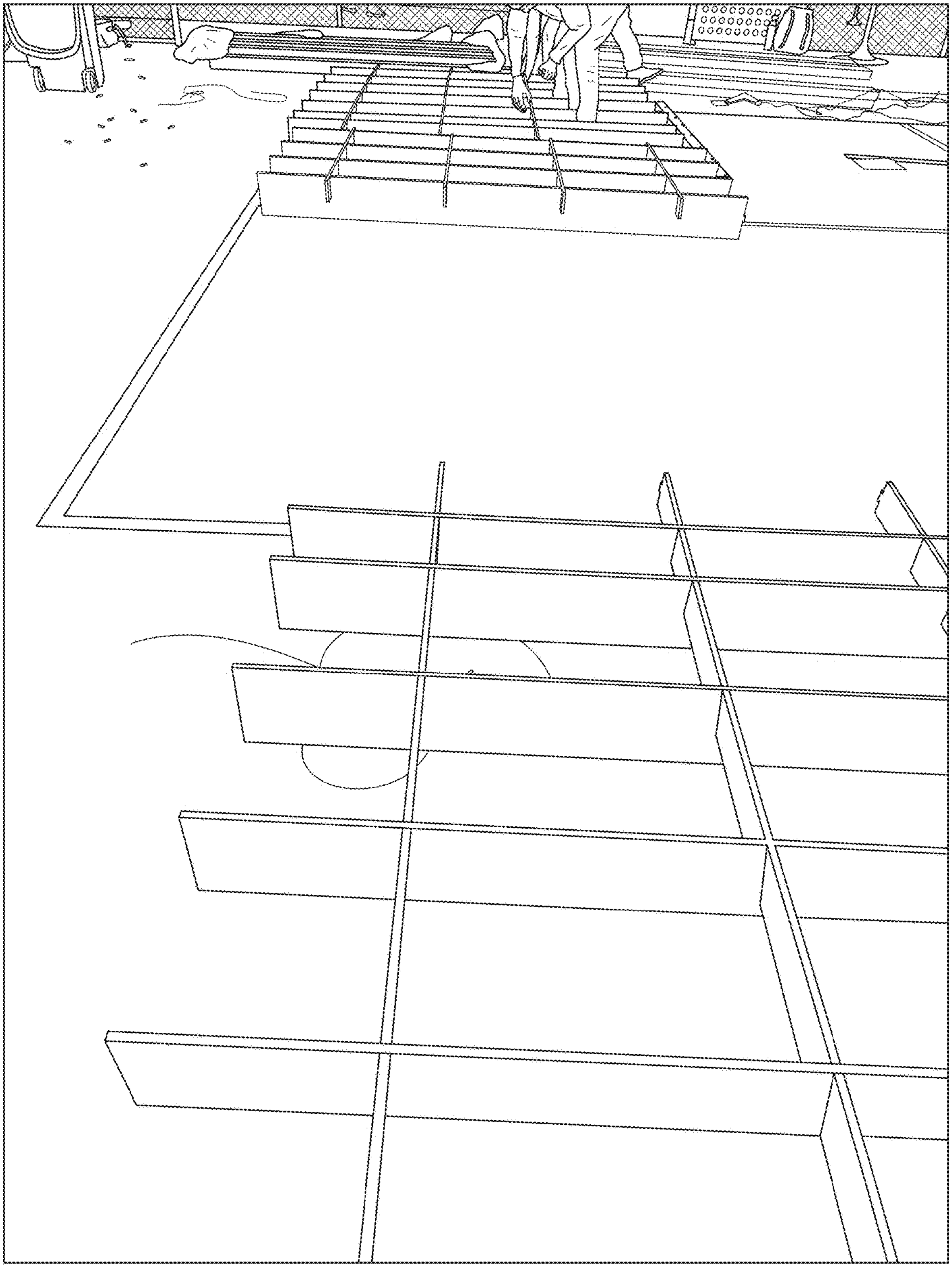
FIG. 21 is another image of multiple assembled sections of the noise baffle grid, resting on the court surface, with two of the grid sections in the background aligned on the court in the relative location at which they will be hung above the court.

With respect to FIG. 21, two assembled sections of noise baffle grid have been assembled and positioned on the court surface, corresponding to the location of each section when it is raised and installed above the court. A third assembled section is in the foreground, along an overrun, so that it is out of the way of the mechanical lift that will be used to raise the two sections in the background.

Figure 22:
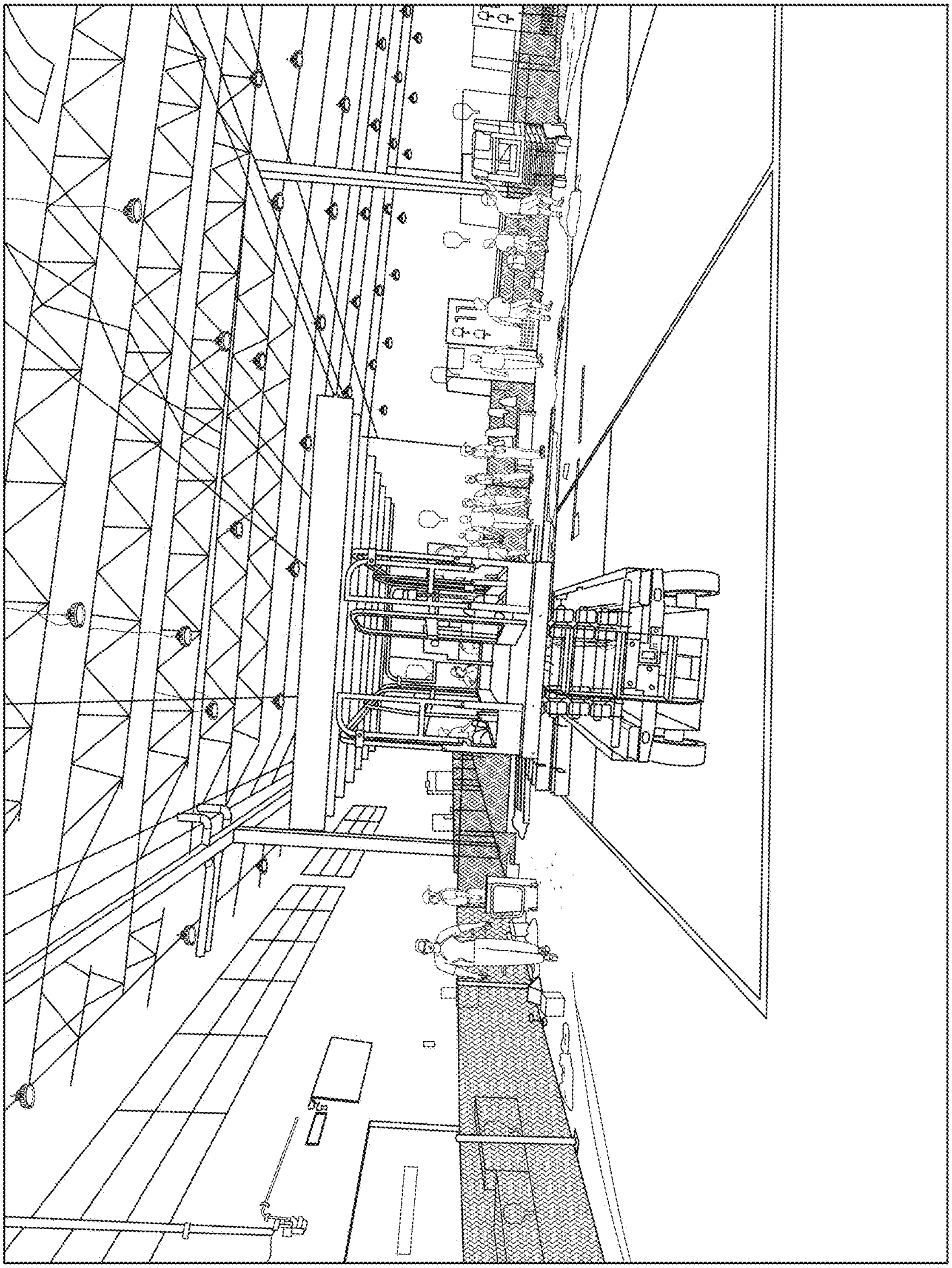
FIG. 22 is an image of one of the assembled sections of the noise baffle grid being raised above the court surface by a mechanical lift, in order to hoist it into its installation position above the court surface.
Figure 23:
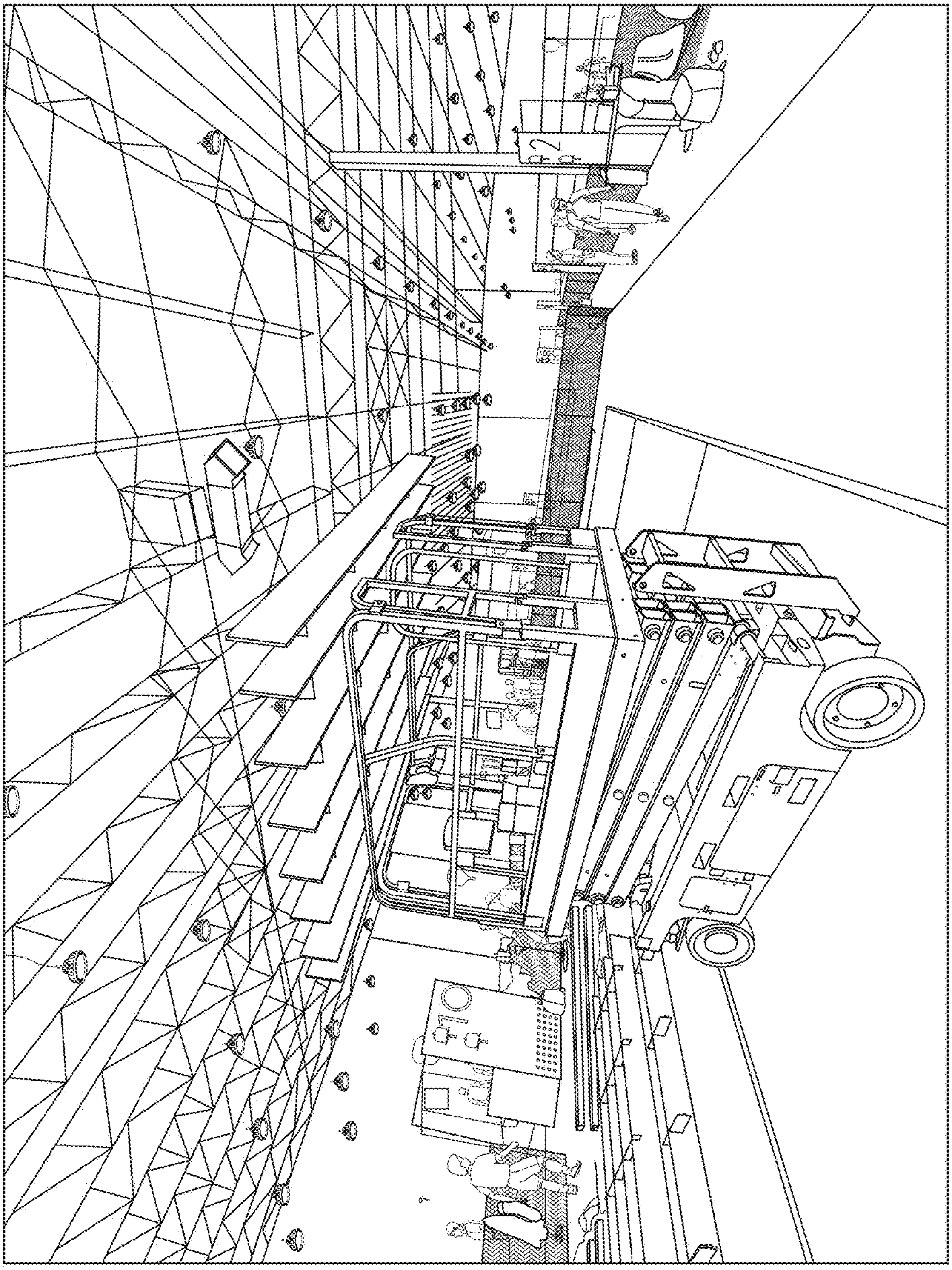
FIG. 23 is another image, from a different angle, of the assembled section of the noise baffle grid being raised above the court surface by a mechanical lift, in order to hoist it into its installation position above the court surface.
Figure 24:
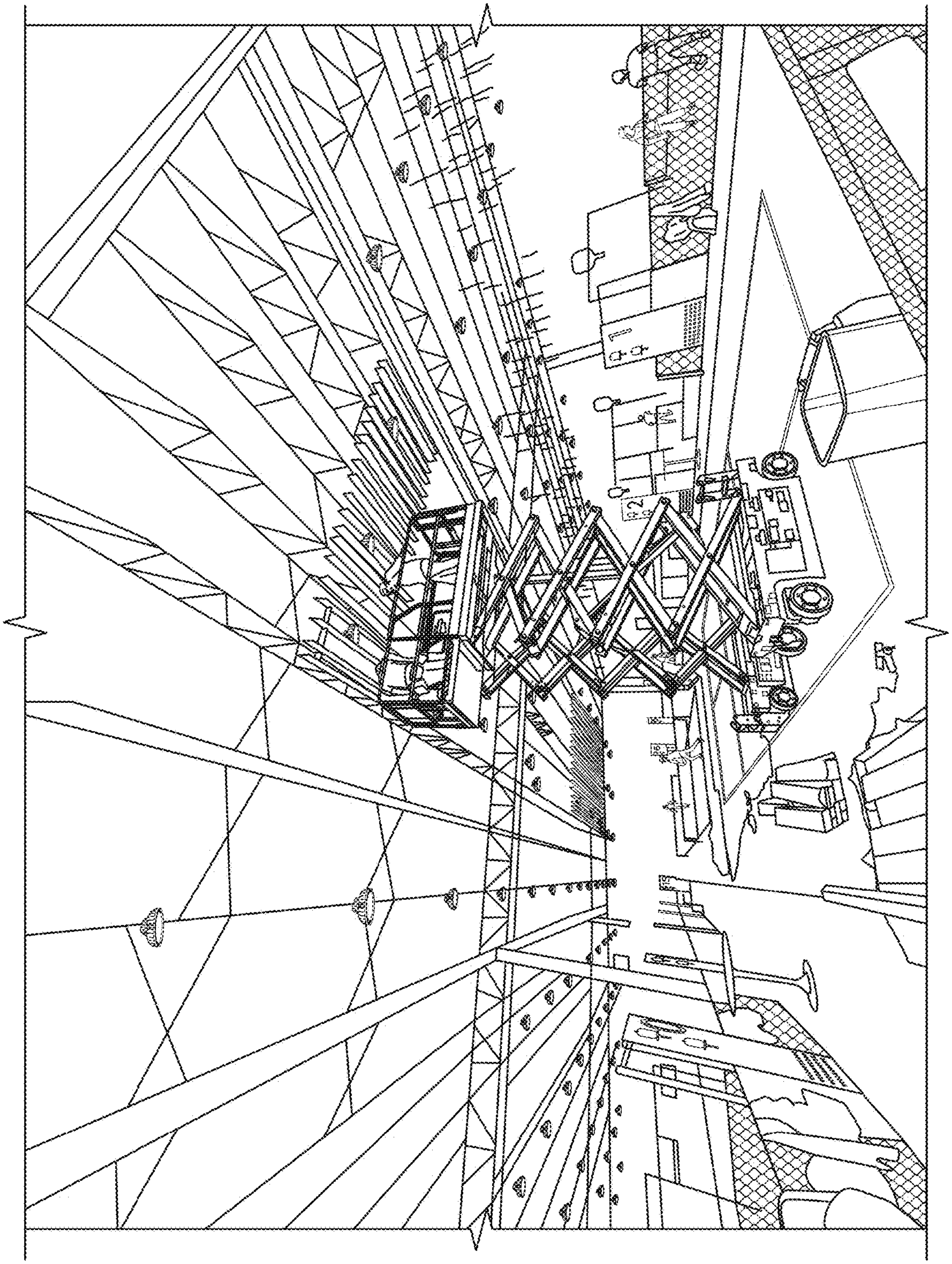
FIG. 24 is an image showing workers using a second lift, in conjunction with the first lift, to secure the raised assembled noise baffle grid section into its installation position above the court surface so that it can be secured by the previously installed noise baffle grid support wires.
Figure 25:
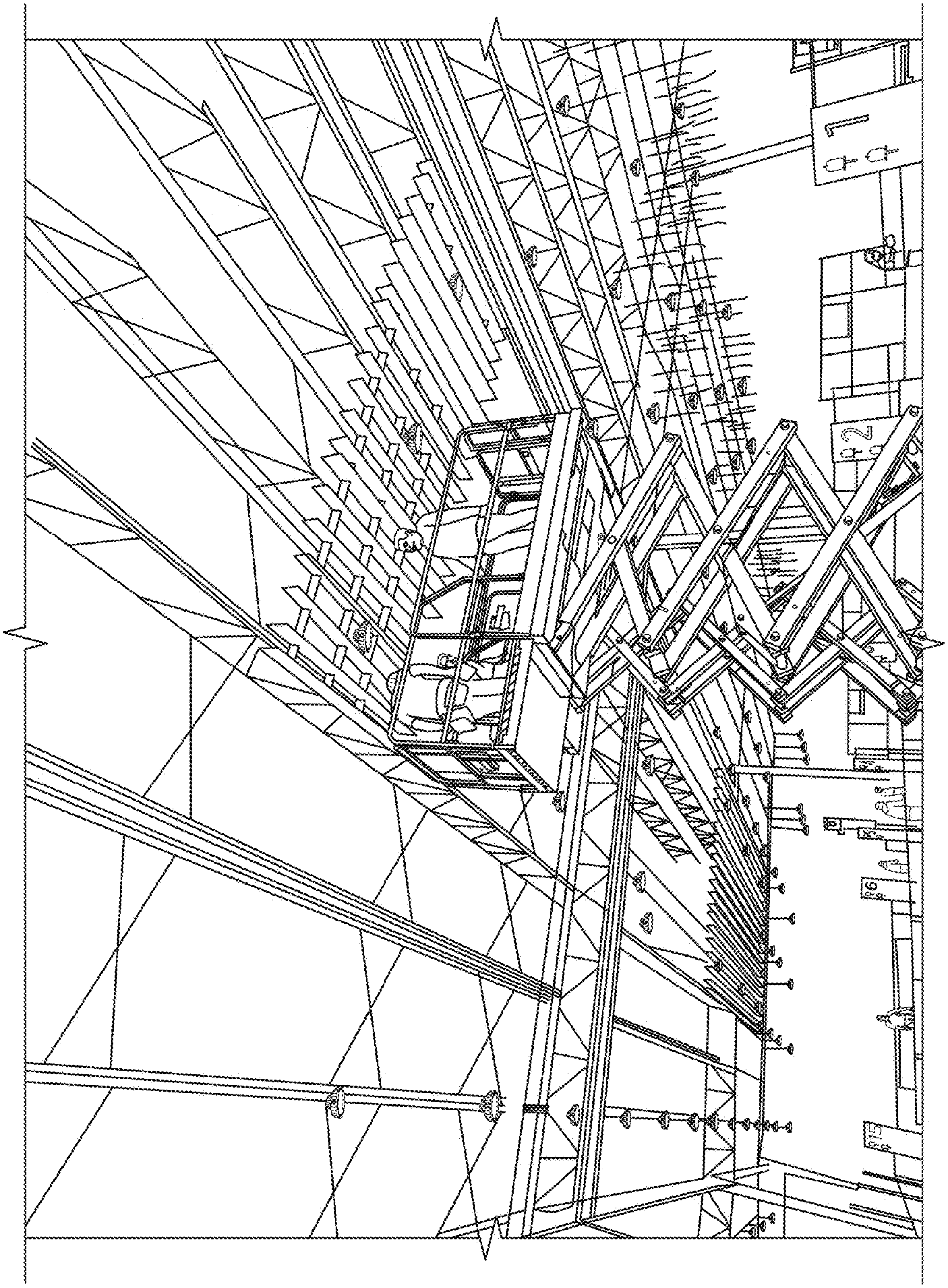
FIG. 25 is a close-up image of the installation step of FIG. 24.
Figure 26:
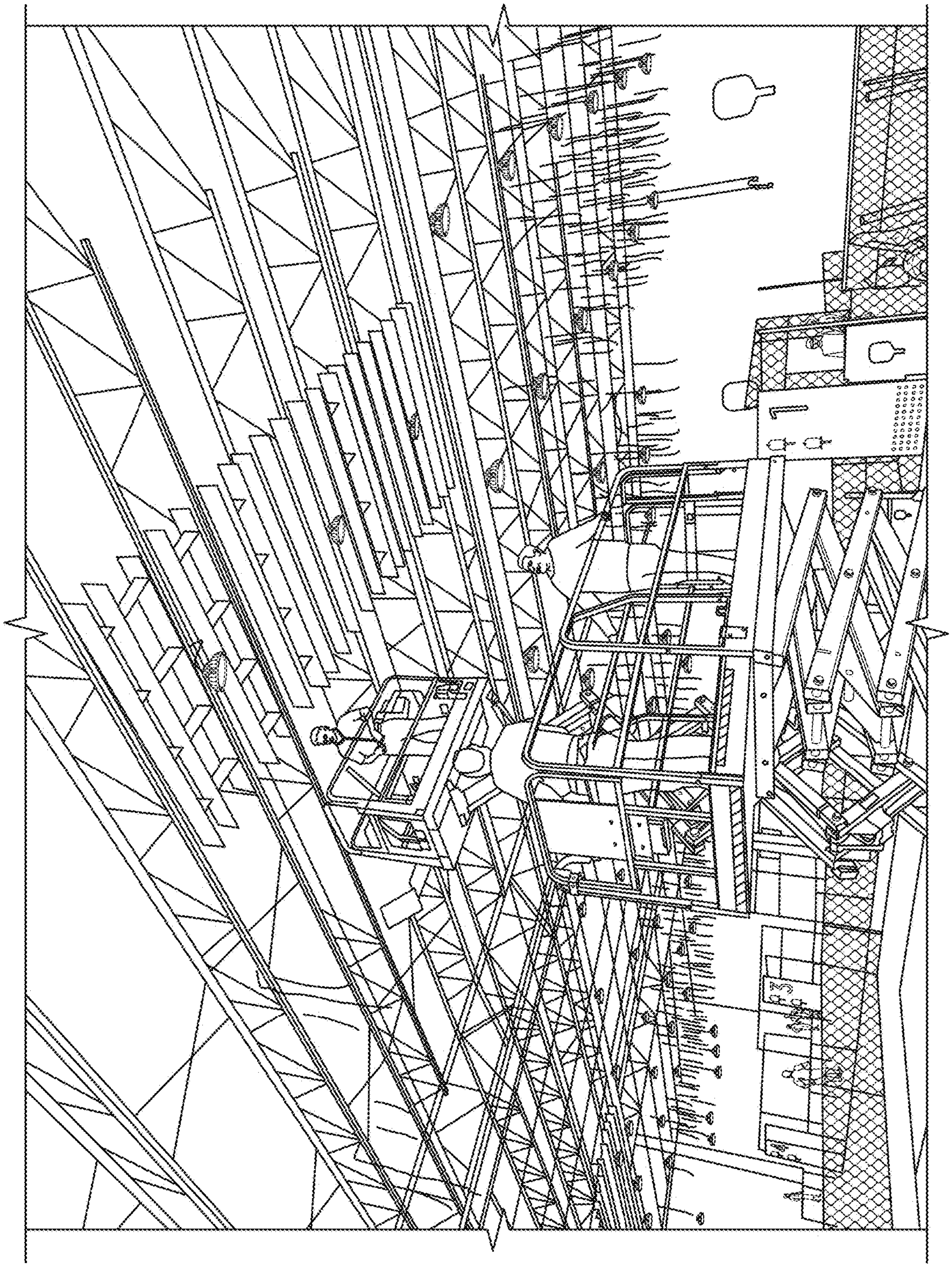
FIG. 26 is an image showing workers on two different lifts, working to connect an installed first section of the noise baffle grid to a second installed section of the noise baffle grid.
Figure 27:
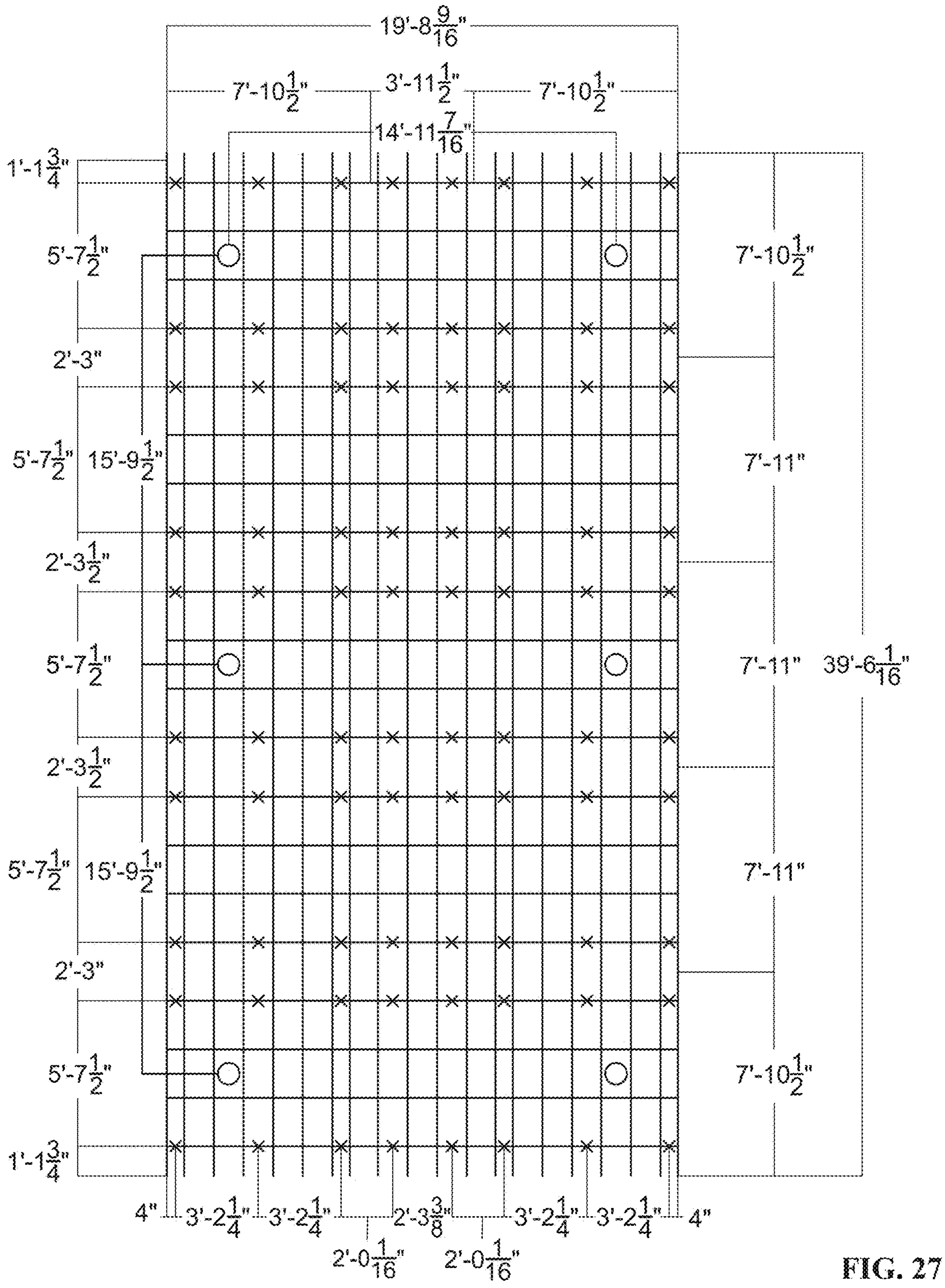
FIG. 27 is a schematic plan diagram of the noise baffle grid, with overall system dimensions, baffle blade relative spacing, and anchor point locations, for a six-light-fixture configuration.

With respect to FIGS. 22 and 23, an assembled section of noise baffle grid is loaded onto a mechanical lift, so that it can be raised into place. In FIGS. 24-26, two mechanical lifts are placed side-by-side, so that worker can lift sections of grid on one lift, and then be in the other lift to attach the grid support wires to the lifted section(s) at the appropriate anchor point alignment holes of each section of grid.

When fully assembled and installed, the noise baffle grid's area and position will generally correspond to the area of, and position of, the pickleball court surface. Put another way, in a preferred embodiment, the noise baffle grid is hung directly over the pickleball court, and its baffles cover the entire court surface (i.e., it fits just inside the court lines). Further, in a preferred embodiment, the noise baffle grid is hung at the minimum allowed height above the pickleball court surface, which, depending on the rule followed, it either 18 feet, or 20 feet, above the court surface. This position and height serves to maximize the effectiveness of the noise baffle grid, because it is as close as allowable to the source of the noise, i.e., the striking of the pickleball by paddles on the court. This is in contrast to prior art teachings, which place the sound baffles higher toward the ceiling, and positioned either randomly, or at regular intervals throughout the facility, rather than directly above each court and at the minimum allowable height.

Also unique to the disclosed noise baffle grid system is that the cross members that structurally hold the system together and hold it up. Prior art sound baffles and grid systems typically require installation of a metal support structure (Unistrut) upon which sound deadening panels are mounted. In contrast, the presently disclosed system is mounted entirely to the ceiling without any additional metal or structural strengthening members needed.

Figure 28:
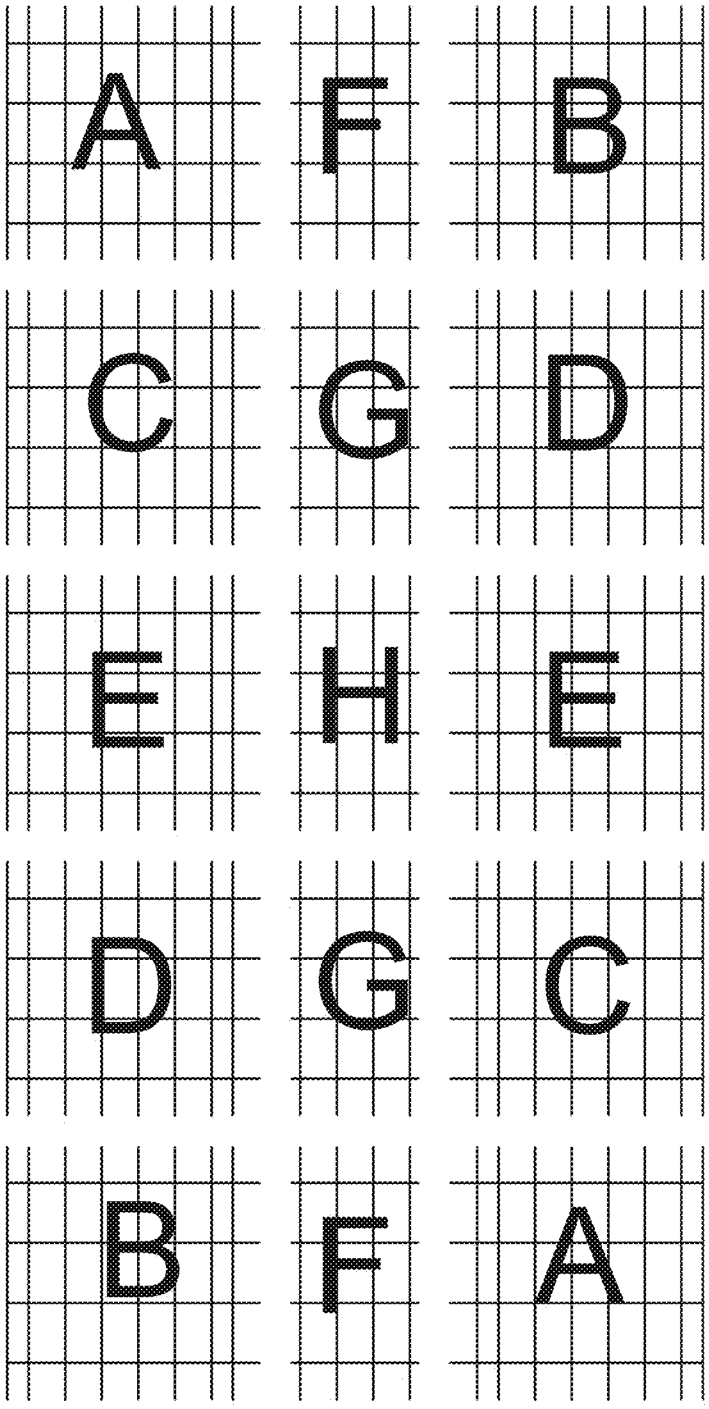
FIG. 28 is a schematic plan diagram of the FIG. 27 noise baffle grid, with indications of the different sections from which it is assembled, and their installation positions with respect to one another.
Figure 29:
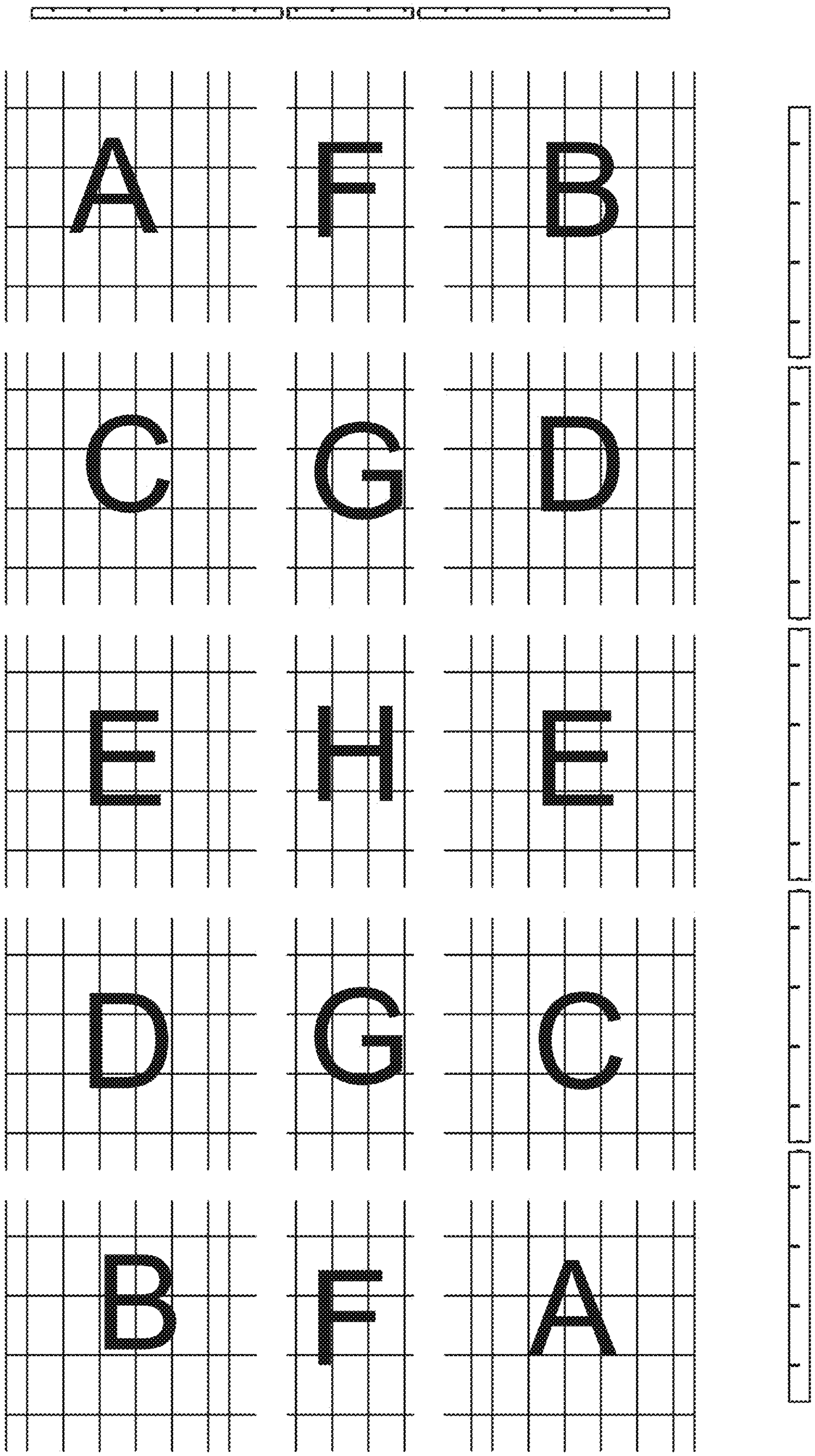
FIG. 29 is another schematic plan diagram of the FIG. 27 noise baffle grid, showing the two different colors of material that are used and also showing connection points and dovetail connections.
Figure 30:
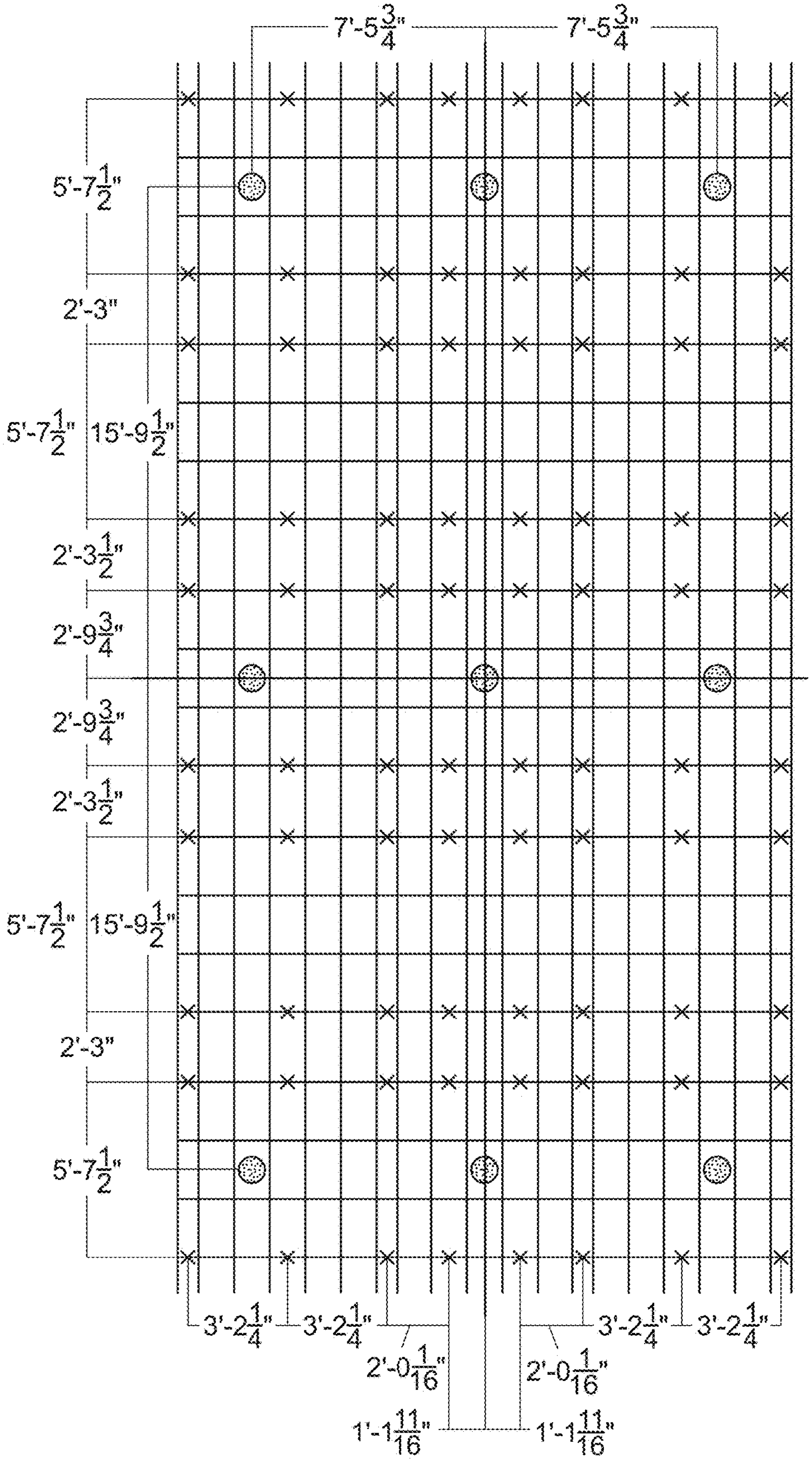
FIG. 30 is a schematic plan diagram of a noise baffle grid, with overall system dimensions, baffle blade relative spacing, and anchor point locations, for a nine-light-fixture configuration.
Figure 31:
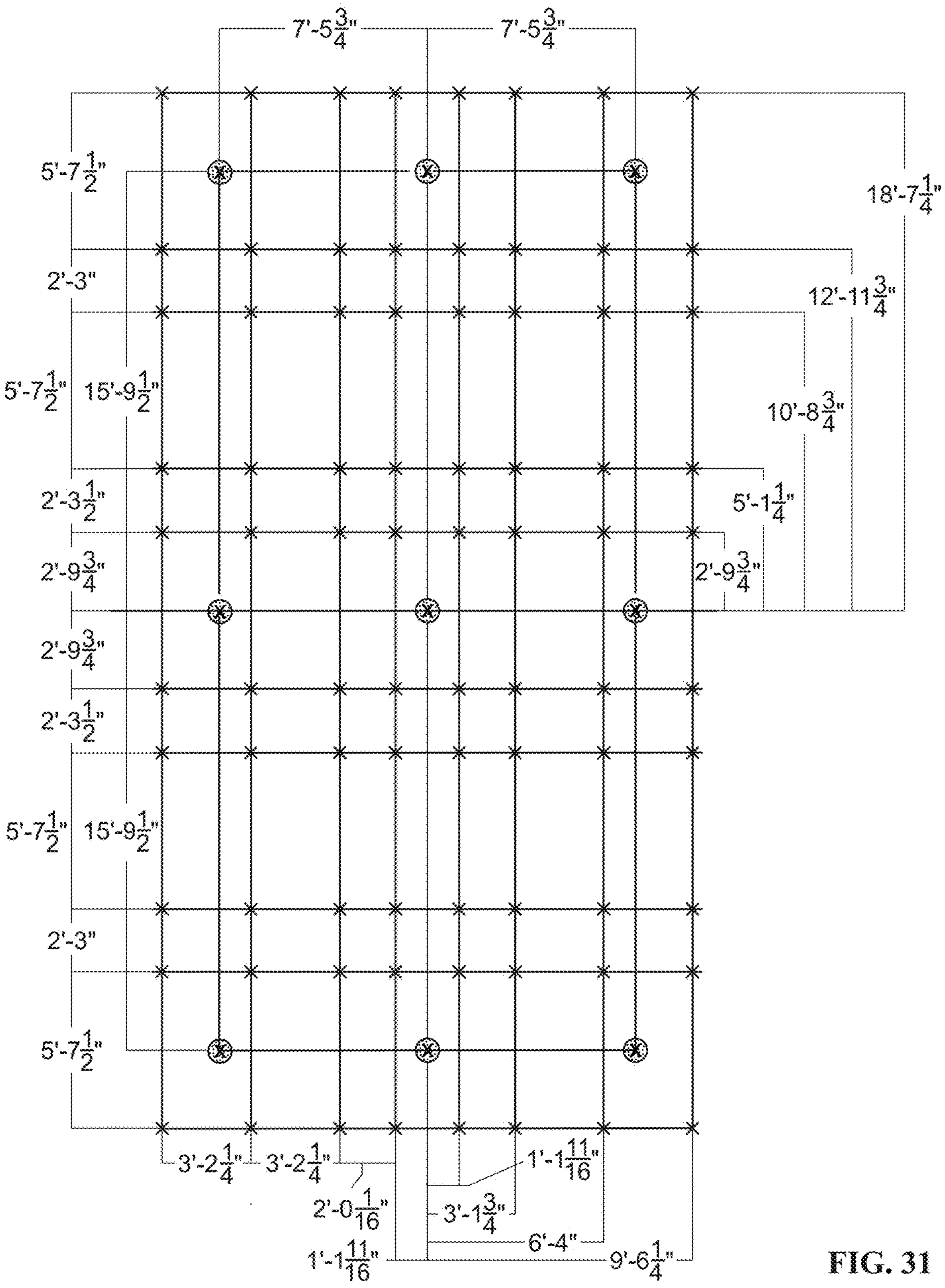
FIG. 31 is a schematic plan diagram of the noise baffle grid of FIG. 30, with further detail including dimensions for how far apart the anchor points are from the center point, to enable easier layout during assembly and installation.
Figure 32A:
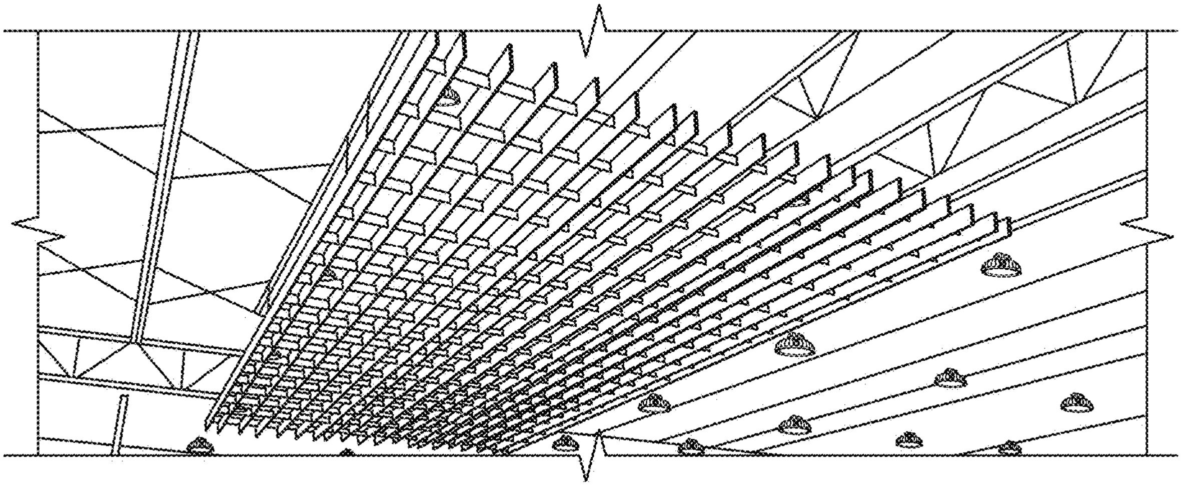
FIGS. 32A-D show various views of one embodiment of the noise baffle grid disclosed herein.
Figure 32B:
Figure 32C:
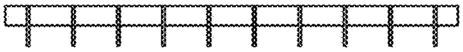
Figure 32D:
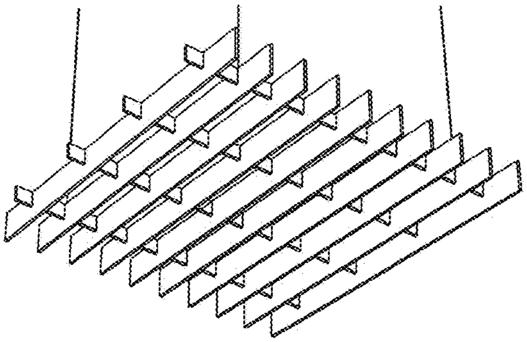
Figure 33A:
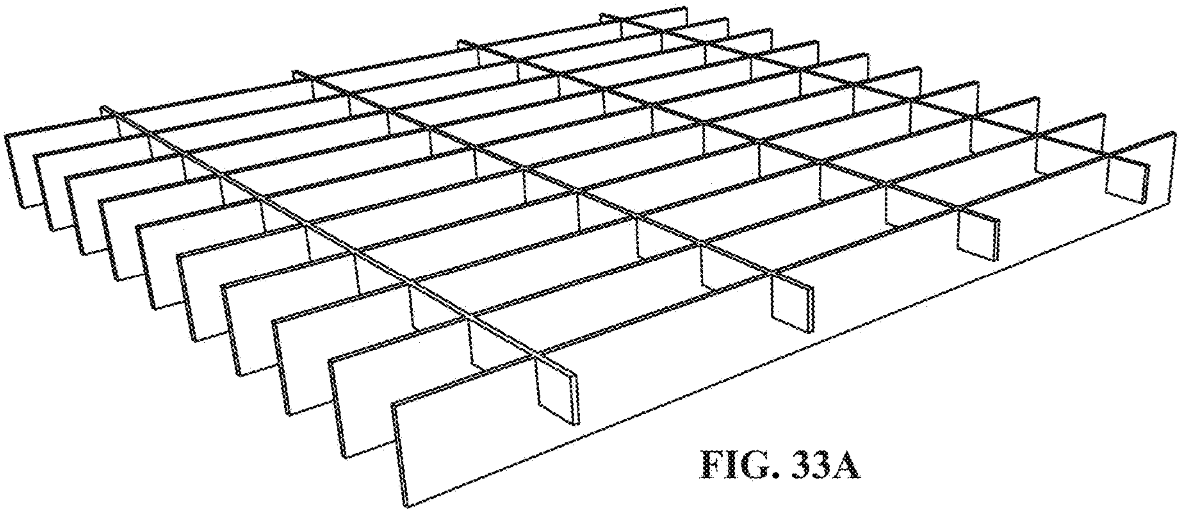
FIGS. 33A-E show an assembly guide for one embodiment of the noise baffle grid disclosed herein.
Figure 33B:
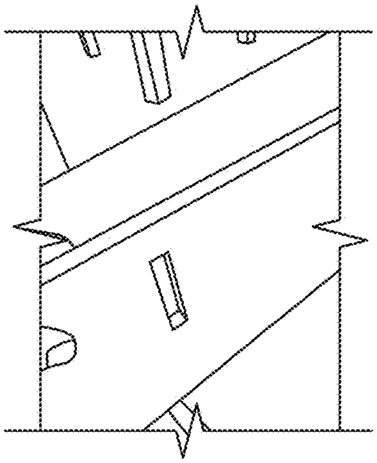
Figure 33C:
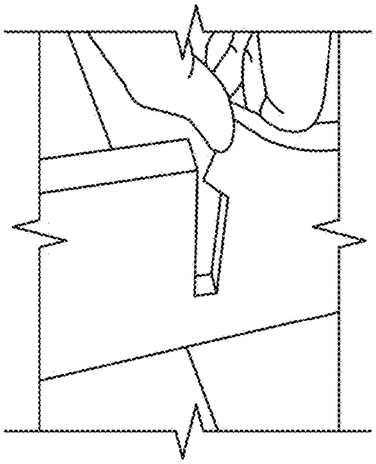
Figure 33D:
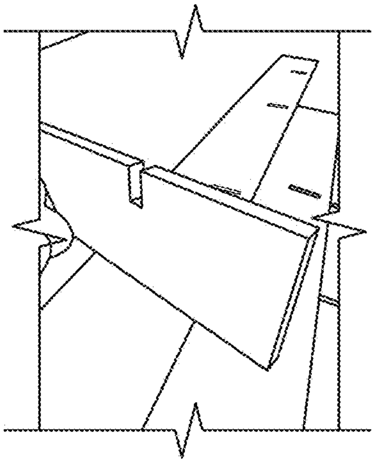
Figure 33E:
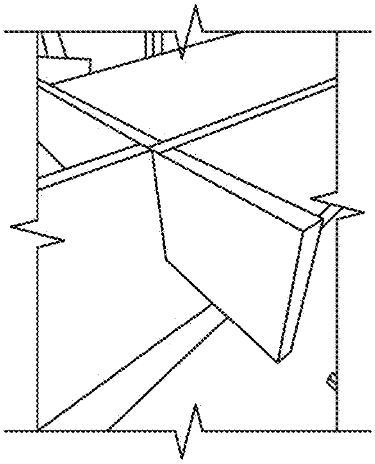
Figure 34:
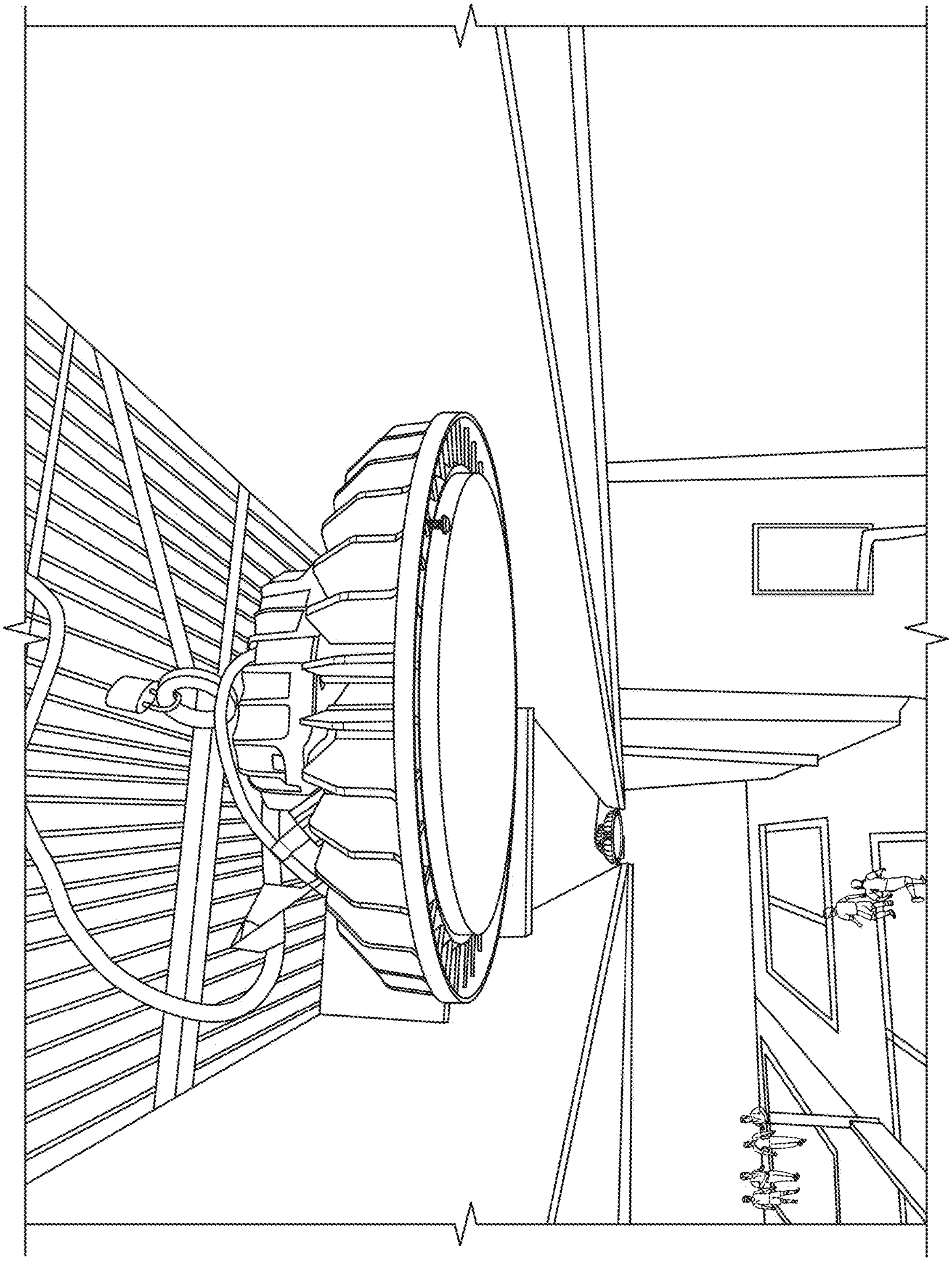
FIG. 34 is a close-up image of a direct downward light fixture, installed such that it is within the outside perimeter of the disclosed noise baffle grid and such that the bottom edge of the light fixture is above the bottom edge of the noise baffle grid.
Figure 35:
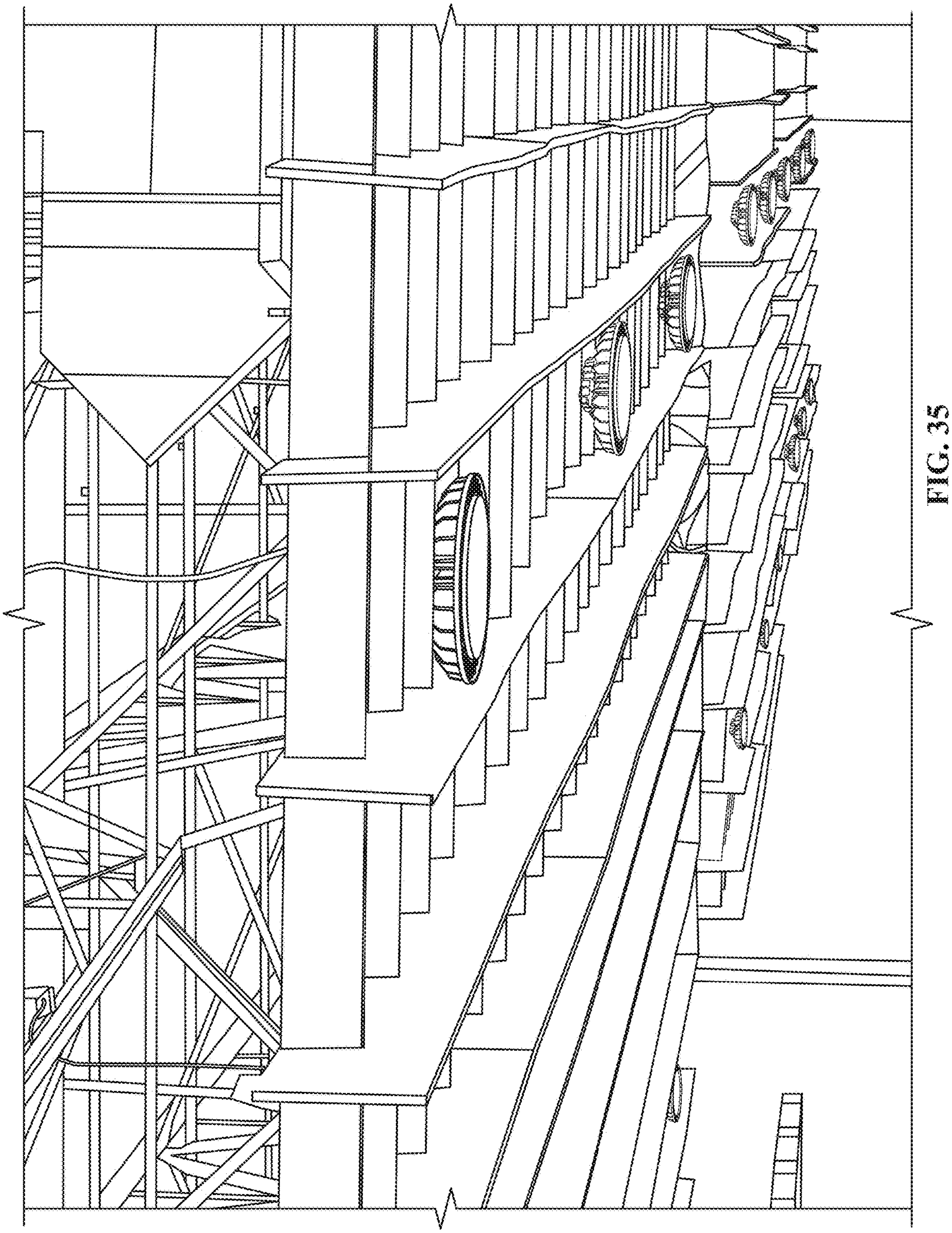
FIG. 35 is a medium range image of multiple downward light fixtures, installed such that they are within the outside perimeter of the noise baffle grid and such that the bottom edges of each of the multiple light fixtures are above the bottom edge of the noise baffle grid.
Figure 36:
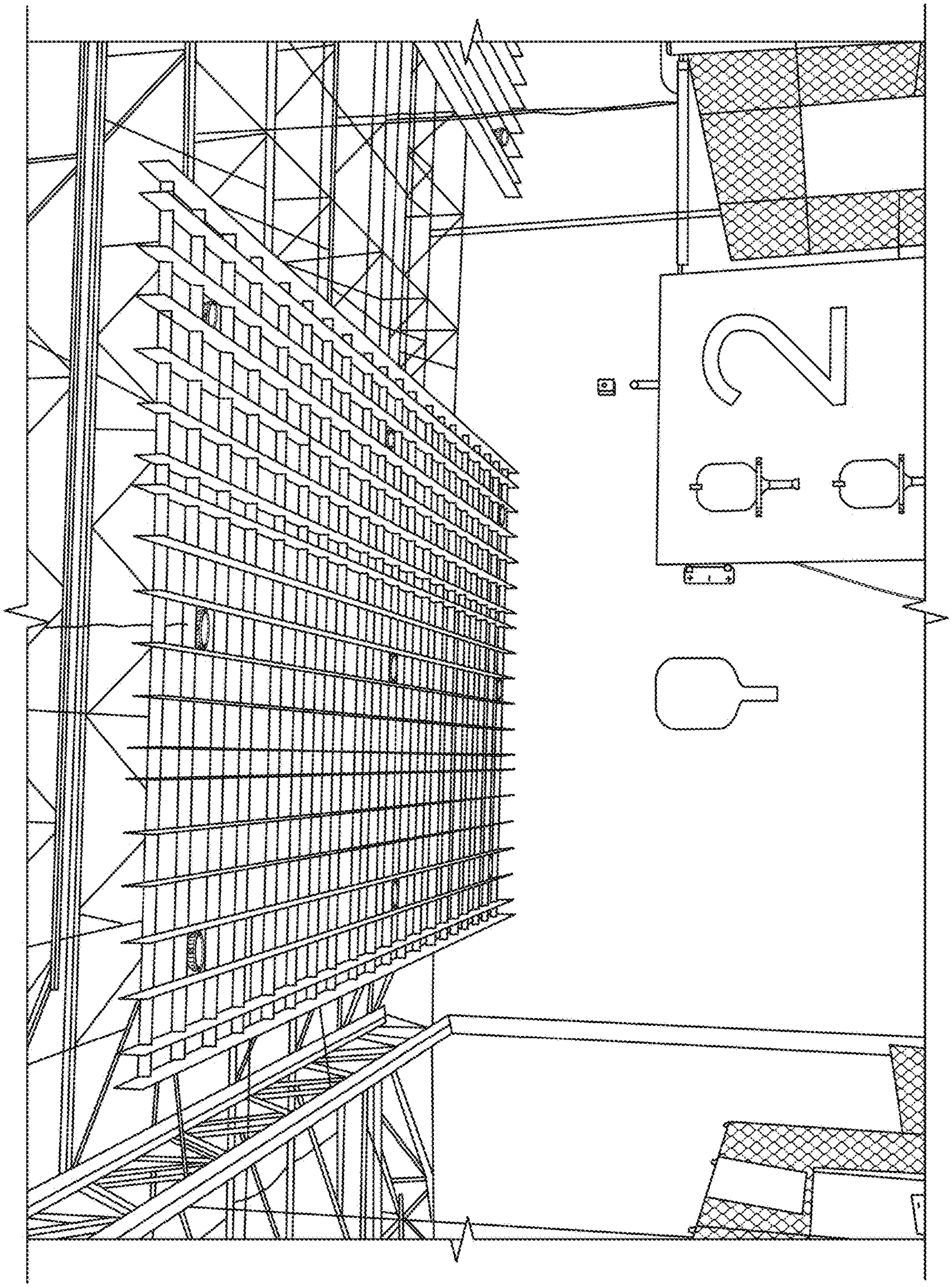
FIG. 36 is an upward looking image of the light fixtures and noise baffle grid installed over a pickleball court, when viewed from outside the playable surface of the court.
Figure 37:
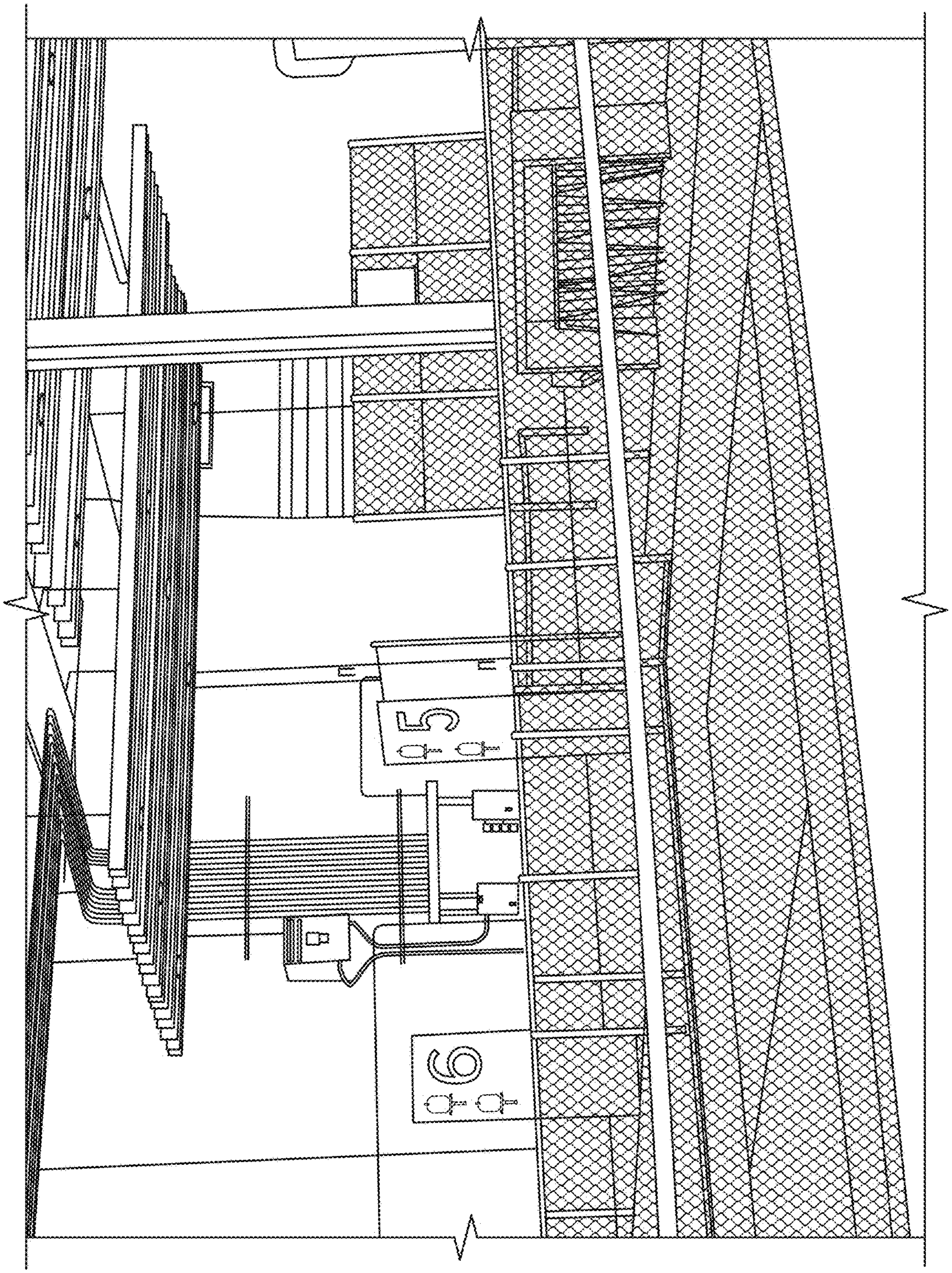
FIG. 37 is an image of a typical player's view, from the playable surface of the court, looking upward and toward another nearby lighted pickleball court, showing the manner in which the noise baffle grid masks some of the light and glare in a lateral direction.

With respect to FIGS. 27-31, schematic plan views of two different embodiments are provided. FIGS. 27-30 show a six-light-fixture embodiment, and indicate the dimensions and placement of the lights, anchor points, and baffles. FIGS. 28 and 29 also illustrate how the noise baffle grid system can be constructed from seven different sections (labeled A-F), so that the system may be modular. FIG. 31 shows a nine-light fixture embodiment, and similarly indicates the dimensions and placement of the lights, anchor points, and baffles.

With respect to FIGS. 32A-D, images from a product data and specification sheet are provided, with further details regarding the presently disclosed embodiments described herein. The noise baffle grid is of a Cloud Grid style, which is made of 100% PET (>75% recycled PET material). The grids have a thickness of 12 millimeters and a density of 1900 g/sgm-2400 g/sgm (approximately 12 pcf). The cloud grid is 20 feet×40 feet and composed of interlocking 4×8 and 8×8 modules, with an 8 inch blade height (4-inch cross members). The cloud grid systems are suspended using aircraft cable from pre-drilled holes on specific panels-typically 48 inch spacing on center no further than 24 inches from edge of system. Each cloud system includes 10 feet of cable and Gripple. Of note, the presently disclosed embodiment has been tested to provide an Acoustic NRC of up to 0.85.

With respect to FIGS. 33A-E, an assembly guide is provided, showing details regarding the interlocking cross-members and blade baffles, mounting hole position, and a step-by-step assembly guide (FIGS. 33B-E). All such details are incorporated by reference into the present written description, as if set forth herein in their entirety.

With respect to FIGS. 34-37, in accordance with the embodiments disclosed herein, the light fixture and noise baffle grid are hung with respect to one another such that the light fixture(s) are inside the outer perimeter of the noise baffle grid. Further, in a preferred embodiment, all of the light fixtures are downwardly facing direct light fixtures. Each of the downwardly facing direct light fixtures are positioned such that they are inside the outer perimeter of the noise baffle grid. In a still further preferred embodiment, the light fixture(s) have a bottom edge, and the noise baffle grid has a bottom edge, and the lighting fixture(s) are hung such that the light fixture bottom edge is equal to, or above, the bottom edge of the noise baffle grid bottom edge. In some embodiments, the bottom edge of the light fixture is positioned level to the bottom edge of the noise baffle grid. In other embodiments, the bottom edge of the light fixture is positioned above the level of the bottom edge of the noise baffle grid. In various embodiments, vertical distance between the bottom edge of the light fixture and the bottom edge of the noise baffle grid is alternatively about one inch, about two inches, about three inches, about four inches, about five inches, about six inches, between zero and about 0.5 inches, between about 0.5 inches and about one inch, between about 0.5 inches and about 1.5 inches, between about 0.5 inches and about 2 inches, between about 0.5 inches and about 2.5 inches, or between about 0.5 inches and about 3 inches.

With further respect to FIGS. 34-37, glare is further reduced by eliminating, or at least minimizing, the use of indirect lighting within the indoor pickleball facility. In certain embodiments, indirect lighting is completely eliminated. In other embodiments, indirect lighting is less than 40% of the total light distribution. In other embodiments, indirect lighting is less than 35% of the total light distribution. In other embodiments, indirect lighting is less than 30% of the total light distribution. In other embodiments, indirect lighting is less than 25% of the total light distribution. In other embodiments, indirect lighting is less than 20% of the total light distribution. In other embodiments, indirect lighting is less than 15% of the total light distribution. In other embodiments, indirect lighting is less than 10% of the total light distribution. In other embodiments, indirect lighting is less than 5% of the total light distribution.

With further respect to FIGS. 34-37, the ceiling and walls of the indoor pickleball facility are painted a dark color, preferably black. In some embodiments, the ceiling and walls are painted black with a matte texture. In other embodiments, the ceiling and walls are painted black with an eggshell or satin texture, to improve wear resistance and enable cleaning. The black ceiling and wall color are contrary to the current state of the art, which calls for painting the ceiling and walls a light color or white, in order to avoid a "cave-like" feeling. Applicants have realized that going against this conventional wisdom provides the advantage of reducing the glare from lighting fixtures. Moreover, Applicants have discovered that the black walls enable players to see a yellow or neon green pickleball during play more easily than when a white background color is used. Applicants also predict that pickleball players will not care about the "cave-like" feeling of the facility in view of the improvements in ball visibility and glare-reduction.

In certain preferred embodiments, the advantages described herein are maximized by the combination of the cloud grid, the cloud grid's position directly above the playable surface of the pickleball court, the direct lighting fixtures, the position of the direct lighting fixtures within the outside perimeter of the cloud grid, the position of the bottom of the direct lighting fixtures either at or above the bottom edge of the cloud grid, the height of the cloud grid and the lighting fixtures with respect to the playing surface, the elimination or minimization of indirect lighting, and the dark or black color of the walls and ceiling of the indoor pickleball facility.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments disclosed.

Insofar as the description above discloses any additional subject matter that is not within the scope of the claims below, the inventions are not dedicated to the public and the right to file one or more applications to claim such additional inventions is reserved.

What is claimed is:

1. A glare-reducing lighting system for an indoor pickleball court, comprising:
- a hanging noise baffle grid; and
- a hanging downwardly directed light fixture,
- wherein the hanging downwardly directed light fixture is positioned within an outside perimeter of the hanging noise baffle grid, and
- wherein a ceiling and walls of the indoor pickleball court are black.

2. The glare-reducing lighting system of claim 1, wherein the hanging noise baffle grid is positioned between about 18 feet and about 20 feet above the indoor pickleball court.

3. The glare-reducing lighting system of claim 1, wherein the hanging downwardly directed light fixture has a bottommost edge, and
- wherein the hanging noise baffle grid has a bottommost edge.

4. The glare-reducing lighting system of claim 3, wherein the bottommost edge of the hanging downwardly directed light fixture is positioned level to the bottommost edge of the hanging noise baffle grid.

5. The glare-reducing lighting system of claim 3, wherein the bottommost edge of the hanging downwardly directed light fixture is positioned above the bottommost edge of the hanging noise baffle grid.

6. The glare-reducing lighting system of claim 5, wherein a vertical distance between the bottommost edge of the hanging downwardly directed light fixture and the bottommost edge of the hanging noise baffle grid is between about 0.5 inches and about 6 inches.

7. The glare-reducing lighting system of claim 1, wherein the glare-reducing lighting system includes a plurality of the hanging noise baffle grids that form a cloud grid positioned directly over a playable surface of the indoor pickleball court.

8. The glare-reducing lighting system of claim 7, wherein the glare-reducing lighting system includes six hanging downwardly directed light fixtures.

9. The glare-reducing lighting system of claim 8, wherein all of the hanging downwardly directed light fixtures are positioned within an outside perimeter of the cloud grid.

10. The glare-reducing lighting system of claim 7, wherein the glare-reducing lighting system includes nine hanging downwardly directed light fixtures.

11. The glare-reducing lighting system of claim 10, wherein all of the hanging downwardly directed light fixtures are positioned within an outside perimeter of the cloud grid.

12. A lighting system for an indoor pickleball court, comprising:
- a plurality of hanging noise baffle grids, wherein the plurality of hanging noise baffle grids define a cloud grid that is positioned directly above a playable surface of the indoor pickleball court; and
- a plurality of hanging light fixtures,
- wherein all of the hanging light fixtures are positioned within an outside perimeter of the cloud grid,
- wherein a ceiling and walls of the indoor pickleball court are black, and
- wherein indirect lighting is less than 40% of a total light distribution on the indoor pickleball court.

13. The lighting system of claim 12, wherein each of the plurality of hanging light fixtures has a bottommost edge, and
- wherein the cloud grid has a bottommost edge.

14. The lighting system of claim 13, wherein the plurality of hanging light fixtures is hung such that each of their respective bottommost edges is positioned equal to or above the bottommost edge of the cloud grid.

15. The lighting system of claim 12, wherein the plurality of hanging light fixtures includes between six and nine hanging light fixtures.

16. The lighting system of claim 12, wherein each of the plurality of hanging light fixtures are positioned at least about 7 feet from each other.

17. The lighting system of claim 12, wherein the cloud grid is positioned between about 18 feet and about 20 feet above the indoor pickleball court.

18. The lighting system of claim 12, wherein indirect lighting is less than 15% of the total light distribution on the indoor pickleball court.

19. The lighting system of claim 12, wherein each of the plurality of hanging light fixtures is positioned inside a different hanging noise baffle grid.

20. A lighting system for an indoor pickleball court, comprising:
- a plurality of hanging noise baffle grids, wherein the plurality of hanging noise baffle grids define a cloud grid that is positioned directly above a playable surface of the indoor pickleball court; and
- a plurality of hanging light fixtures,
- wherein all of the hanging light fixtures are positioned within an outside perimeter of the cloud grid,
- wherein each of the plurality of hanging light fixtures has a bottommost edge,
- wherein the cloud grid has a bottommost edge,
- wherein the plurality of hanging light fixtures is hung such that each of their respective bottommost edges is positioned equal to or above the bottommost edge of the cloud grid,
- wherein the cloud grid is positioned between about 18 feet and about 20 feet above the indoor pickleball court,
- wherein a ceiling and walls of the indoor pickleball court are black, and
- wherein indirect lighting is less than 40% of a total light distribution on the indoor pickleball court.

* * * * *